United States Patent [19]

Koch et al.

[11] 4,436,399

[45] Mar. 13, 1984

[54] APPARATUS FOR TRANSPORTING OR POSITIONING OF A STRIP-SHAPED LIGHT-SENSITIVE MATERIAL WITH REFERENCE TO A PICTURE WINDOW

[76] Inventors: Carl Koch, Im Santenbühl No. 82, Stetten; Karl Gfeller, Kirchweg 120, Langwiesen, both of Switzerland

[21] Appl. No.: 412,376

[22] Filed: Aug. 27, 1982

Related U.S. Application Data

[63] Continuation-in-part of Ser. No. 404,421, Jul. 28, 1982, abandoned, which is a continuation of Ser. No. 161,647, Jun. 20, 1980, abandoned.

[30] Foreign Application Priority Data

Jun. 2, 1979 [CH] Switzerland .......................... 5794/79

[51] Int. Cl.³ .............................................. G03B 17/02
[52] U.S. Cl. ..................................... 354/159; 354/222; 354/289.12
[58] Field of Search ...................... 354/23 D, 159, 222, 354/289

[56] References Cited

U.S. PATENT DOCUMENTS 4,180,314 12/1979 Koch et al. .......................... 354/159

Primary Examiner—Russell E. Adams
Attorney, Agent, or Firm—Watson, Cole, Grindle & Watson

[57] ABSTRACT

A roll film (25) is guided behind a fixed light-path opening (22) in a housing 20 which limits the largest format of the pictures producible with the housing. Opposite areas of the light-path opening (22) may be covered up by two adjustable mask parts (51, 52) in order to change the picture window left open between the mask parts. Operating elements for the selection of the format of the picture window and its position within the light-path opening (22) are coupled with electro-mechanical transducers for producing electrical theoretical value signals. Electro-mechanical transducers (93, 94) for producing electrical actual-value signals are associated with the mask parts (51, 52). A reversible film travel apparatus (65–78) is connected with an electro-mechanical transducer (95) for producing electrical signals. All signals mentioned are fed to an electronic logical circuit module (130). A corrective film travel is controlled via signal outlets of the logical circuit module (130) for changing of the picture window, which with regard to direction and extent corresponds with the position change of that mask part (52) needed to change the picture window, which mask part (52) defines the second transverse edge of the picture window when viewed in the forward travel direction of the film (25). As a result, overlapping of successive latent pictures on film (25) as well as unused areas between these pictures will be prevented, even if the picture window is changed from one picture to another.

24 Claims, 21 Drawing Figures

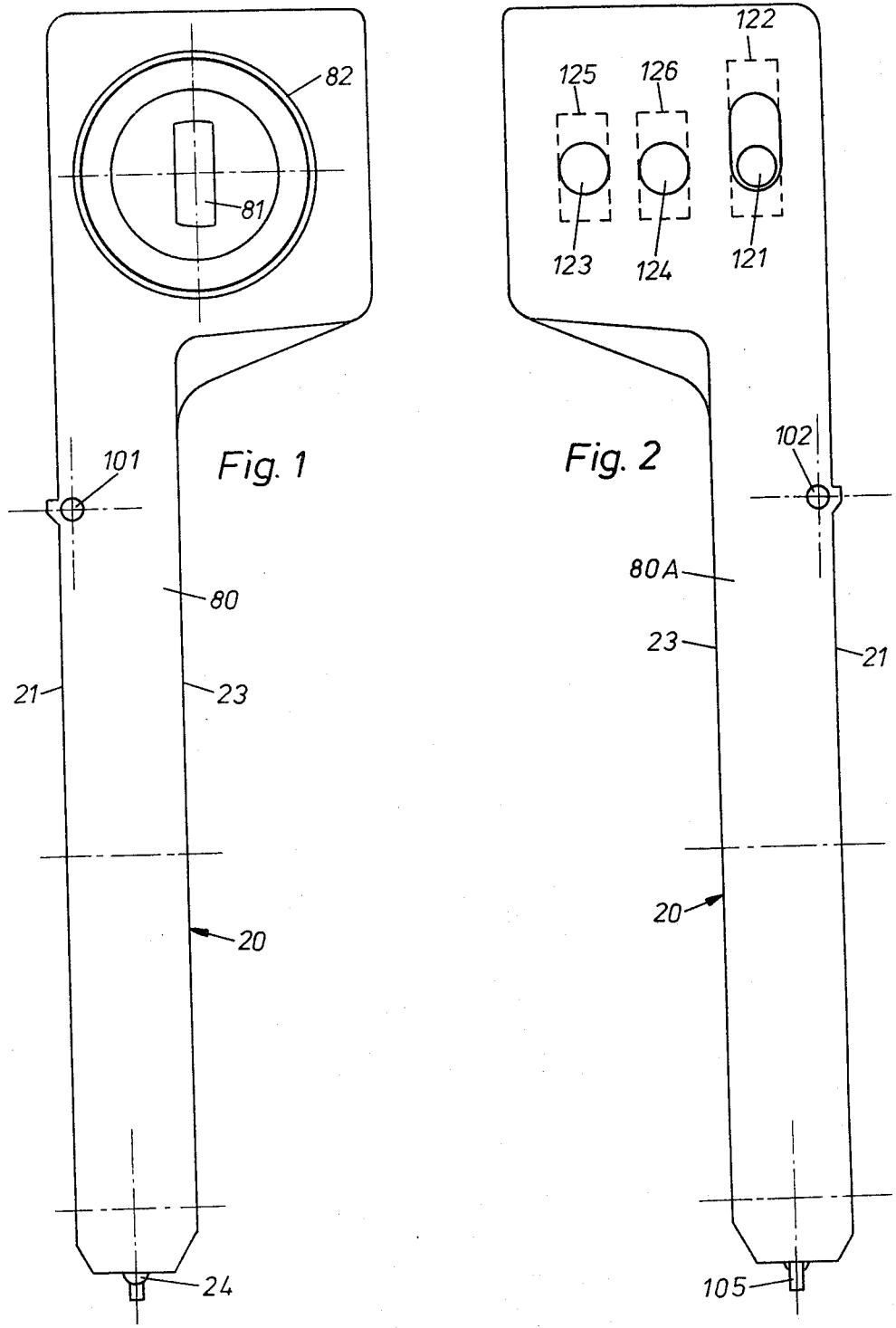

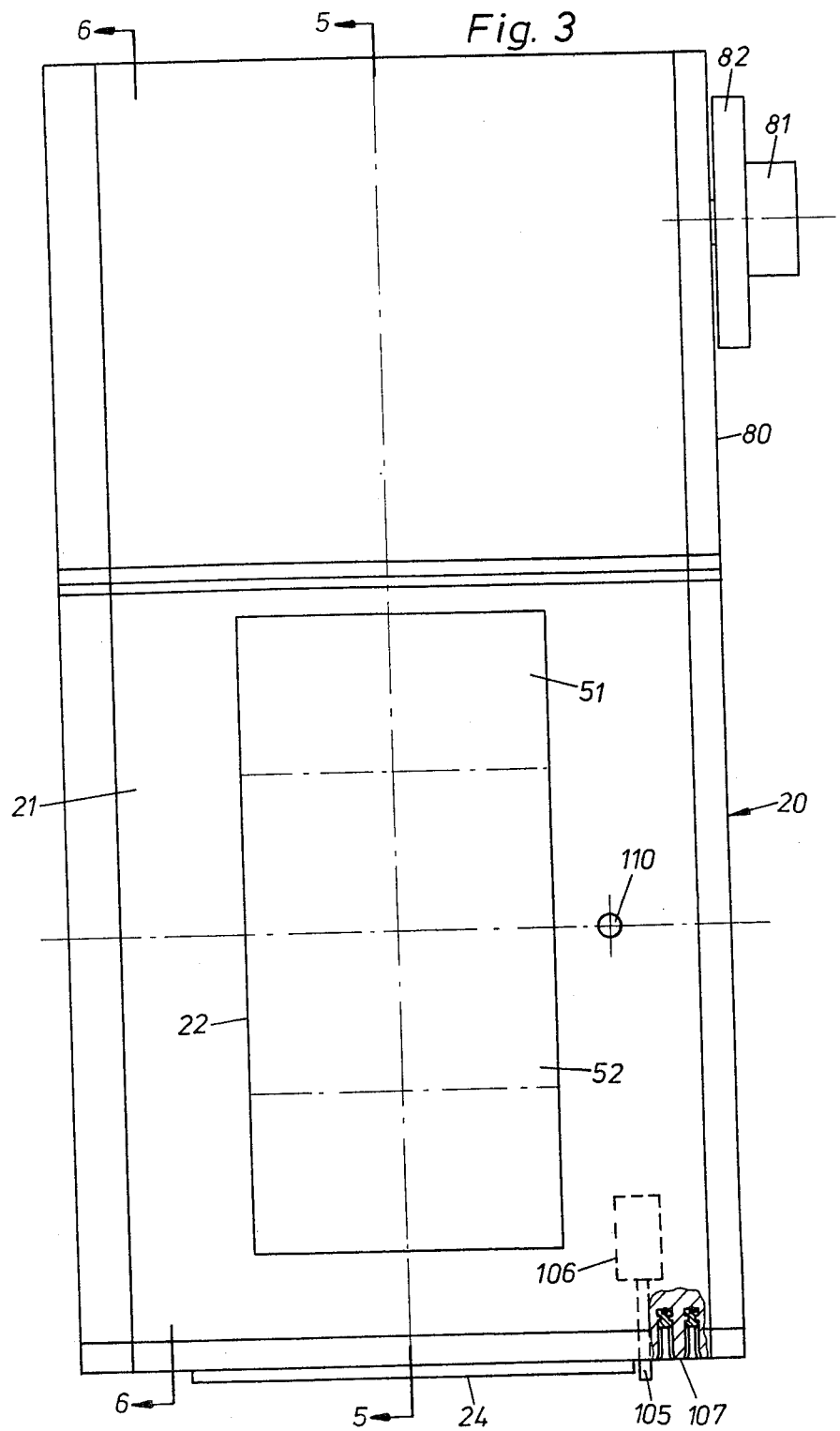

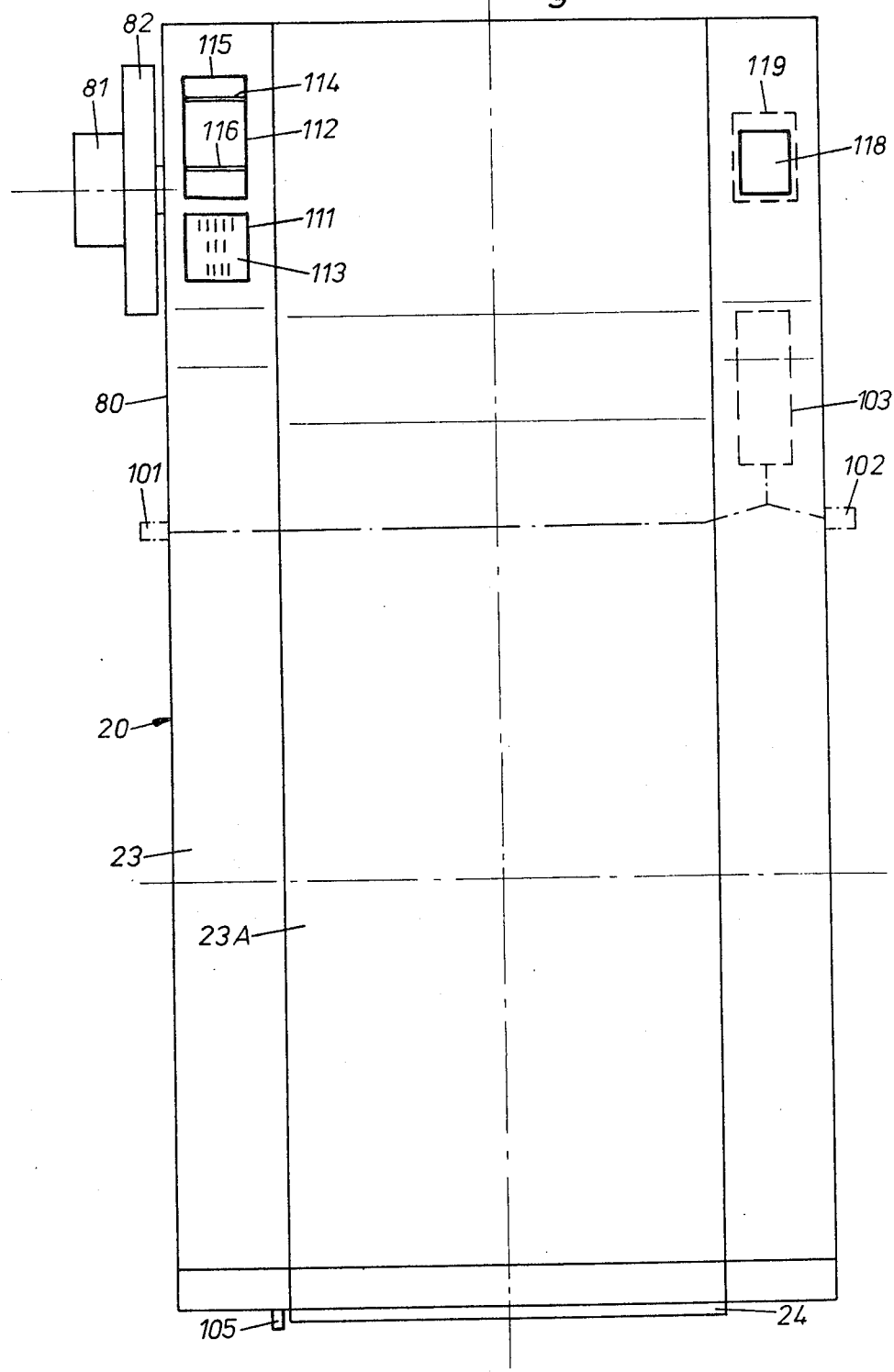

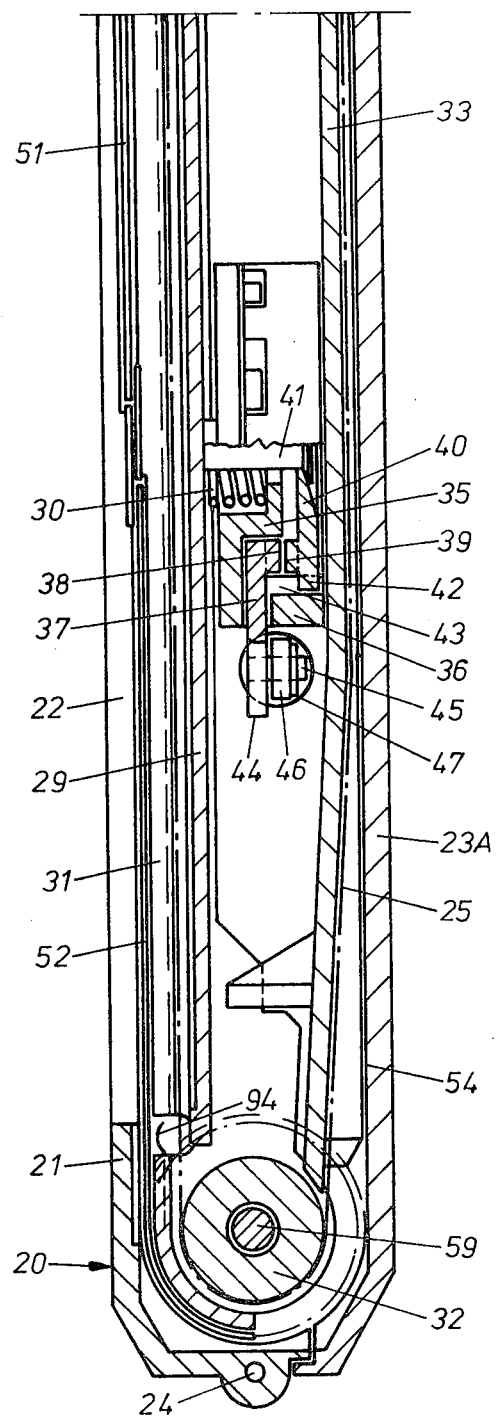

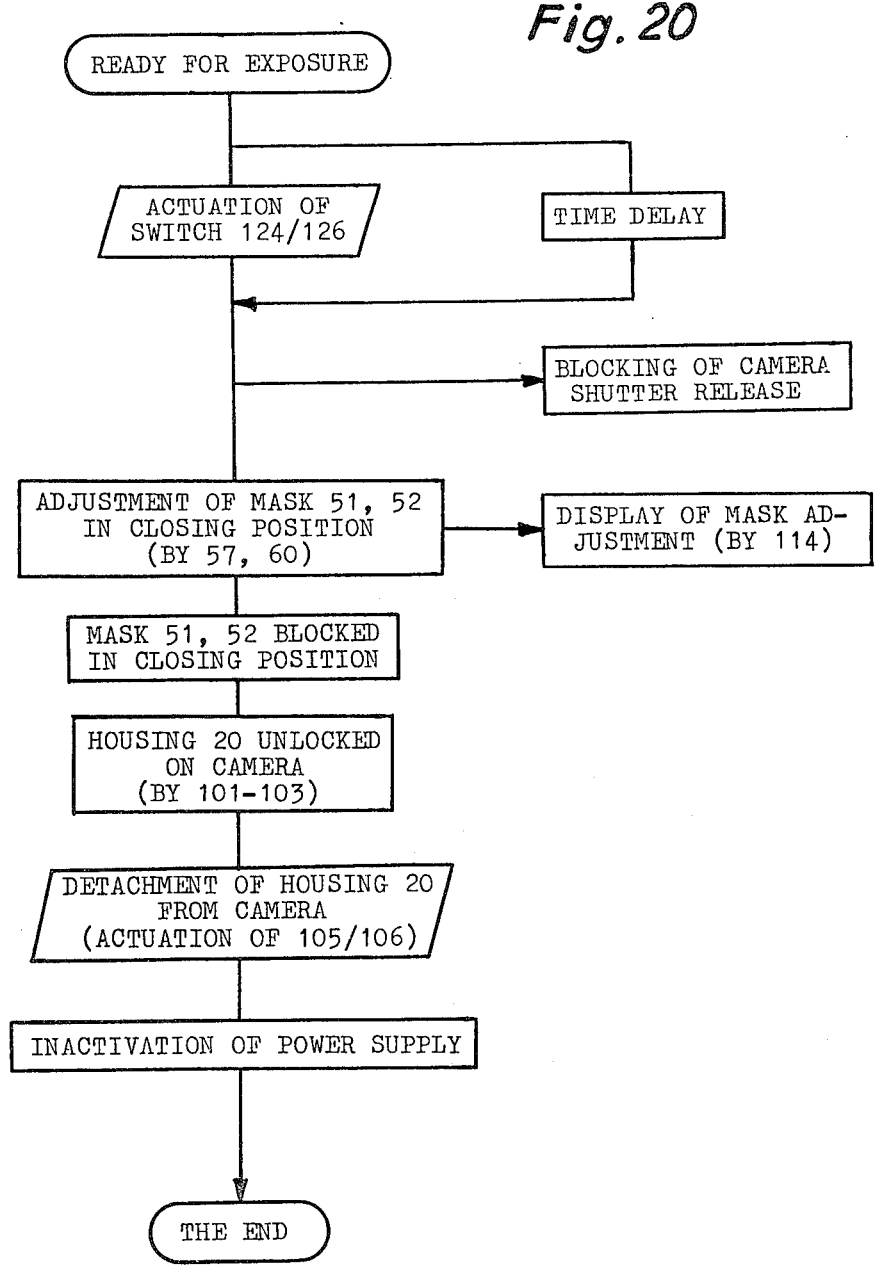

4,436,399

APPARATUS FOR TRANSPORTING OR POSITIONING OF A STRIP-SHAPED LIGHT-SENSITIVE MATERIAL WITH REFERENCE TO A PICTURE WINDOW

CROSS REFERENCE TO RELATED APPLICATION

The present application is a continuation-in-part application of application Ser. No. 402,421, filed July 28, 1982, now abandoned, which in turn was a continuation application of application Ser. No. 161,647, filed June 20, 1980, now abandoned.

BACKGROUND OF THE INVENTION

The present invention relates to an apparatus for the transporting or positioning of a strip-shaped, light-sensitive material with reference to a picture window, which picture window determines the format and position of a photographic picture to be produced on the strip-shaped material, the apparatus including an image field-limiting frame providing a fixed light-path opening; guide elements for guiding the strip-shaped material behind the light-path opening; an adjustable mask for covering up opposing areas of the light-path opening which are located at right angles with respect to the longitudinal direction of the strip-shaped material and for adjusting the format and/or the position of the picture window that is formed by the portion of the light-path opening not covered by the mask (by adjusting the mask both the first transverse edge of the picture window, viewed in the forward direction of travel of the strip-shaped material, and the respective second transverse edge, are adjustable in their position); a control device and associated operating element for selecting the setting of characteristics of the picture window; a transport apparatus for transporting the strip-shaped material in forward steps with respect to its longitudinal direction, which steps are adapted to the size of the picture window defined by the mask; and one-way transmission means inserted between the control device and the transport apparatus for the strip-shaped material, whereby every operation of the control device causing a shift in the position of the second transverse edge of the picture window in the forward travel direction of the strip-shaped material effects at least one equally large forward correcting operation of the transport apparatus.

In U.S. Pat. No. 4,180,314 purely mechanical embodiments of an apparatus of the above-mentioned type are described and shown. However, the disclosed mechanical embodiments are relatively complicated and correspondingly expensive because of the required high degree of precision required for the mechanical components. Moreover, the purely mechanical embodiments are limited with respect to the selection of the picture window setting and in achieving an easy and comfortable handling due to constructional and spacial limitations.

It is an object of the present invention to develop an apparatus of the initially-mentioned type which will require less precise mechanical parts, which will offer universal setting possibilities for the picture window, and which will make possible a comparatively easy and comfortable handling.

SUMMARY OF THE INVENTION

In accordance with the present invention, the apparatus includes a control device for selecting the adjustment of the picture window, the control device including at least one transducer that is coupled with an operating element for producing an electrical signal which defines the pertinent selected adjustment of the picture window; a step-wise transport apparatus for the strip-shaped material, a transducer being connected to the transport apparatus for producing an electrical signal that indicates the pertinent positional change in the strip-shaped material; and a one-way transmission means which includes at least one electronic logical circuit module with several signal inlets and signal outlets, each of the aforementioned transducers being connected with one of the signal inlets of the electronic logical circuit module and at least individual signal outlets of the electronic logical circuit module being connected with devices for controlling the forward travel steps of the strip-shaped material according to the selected size of the picture window and for the correcting transport of the strip-shaped material based on the positional adjustment of the second transverse edge of the picture window.

The inventive apparatus provides the basis for numerous, advantageous further embodiments because the transport of the strip-shaped material in the apparatus is made possible after every photographic picture, based on the characteristics of the picture window set for this picture, as well as the correcting transport of the strip-shaped material, based on the positional shifts of the second transverse edge of the picture window setting and possibly also the adjustment of the mask, i.e, with the help of electrical driving devices which are controlled by the electronic logical circuit module. Furthermore, electro-optical signaling devices may be connected with the electronic logical circuit module, e.g., for indicating the selected setting of the picture window with respect to format and position within the fixed light-path opening and for recording the remaining amount of unexposed strip-shaped material, etc.

A further understanding of the invention will be attained from a review of the accompanying drawings taken in conjunction with the following discussion.

DESCRIPTION OF THE DRAWINGS

FIG. 1 shows a side view of a first embodiment of the inventive apparatus which may be releasably attached to the back of a ground glass camera like a conventional negative cassette;

FIG. 2 is an analogous view of the apparatus of FIG. 1 viewed from the opposite side;

FIG. 3 shows a front view of the apparatus of FIG. 1;

FIG. 4 represents a rear view of the apparatus of FIG. 1;

FIGS. 5A and 5B each show, on an enlarged scale, a partial sectional view of the apparatus as seen along line 5—5 of FIG. 3;

FIG. 20 shows another flow chart schematically illustrating the steps for detaching the device from a photographic camera.

DETAILED DESCRIPTION OF THE PREFERRED EMBODIMENTS

Figure 8:
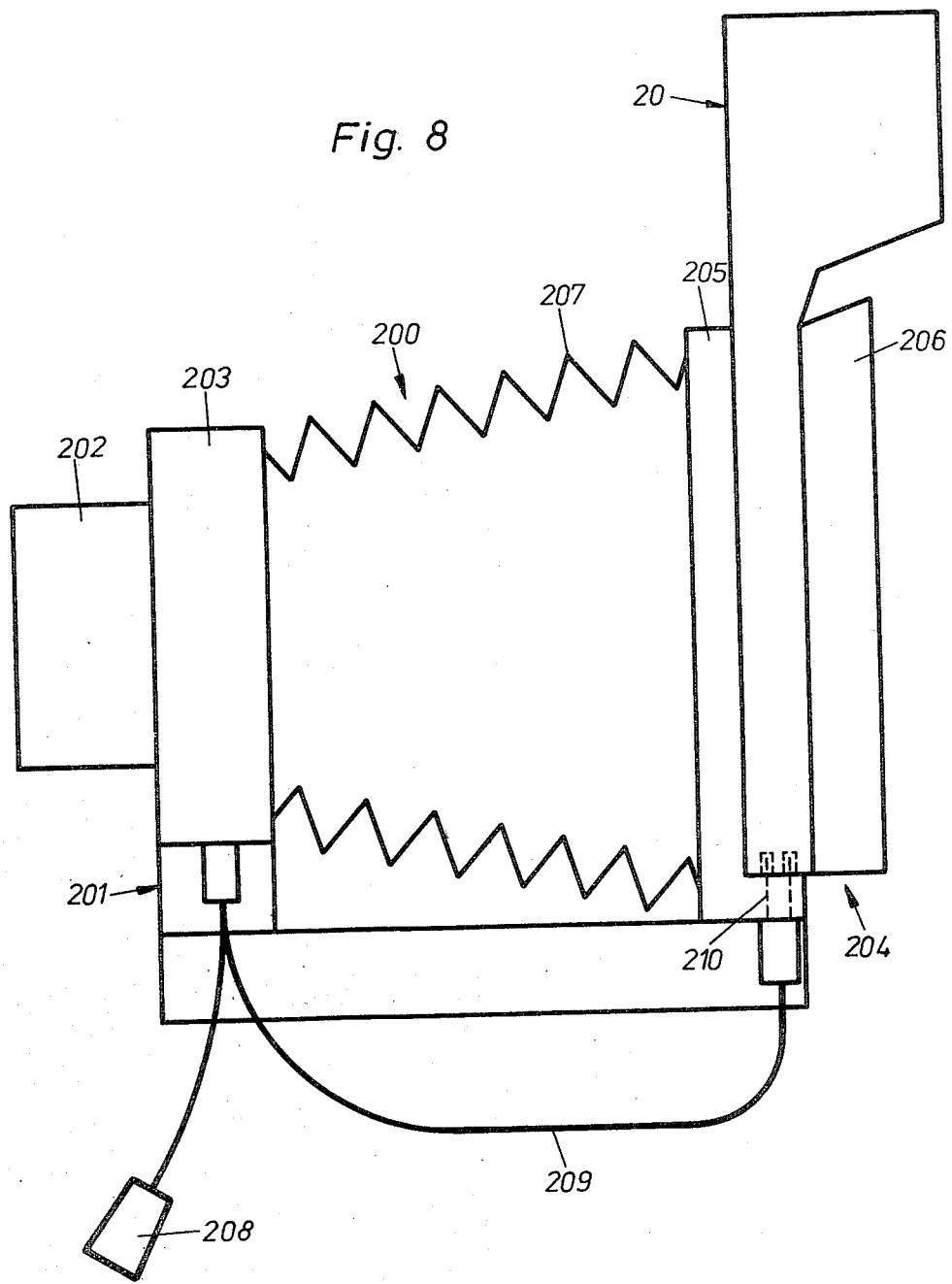
FIG. 8 is a schematic side view of a photographic ground glass camera to which the apparatus shown in FIGS. 1 to 7 is attached.

One embodiment of the inventive device is shown in FIGS. 1 to 7. It includes a light-light housing 20, which as shown in FIG. 8 may be releasably attached to the rear of a ground glass camera of known construction just like a conventional cassette for photographic picture material. The front wall 21 of the housing 20 has a picture area-limiting frame that forms a rectangular light-path opening 22 (FIGS. 3, 5A, 5B), this light-path opening determining the largest format of photographic picture producible with this device. The light-path opening may for example measure 6×12 cm. The rear wall 23 of the housing 21 is constructed partly as a hinged cover 23A (FIG. 4) that is pivotally mounted to the front wall 21 by means of a hinge 24.

The subsequently described elements for guiding and holding of a strip-shaped, light-sensitive material 25 (in the present case a roll film) are located inside the housing 20. According to FIGS. 5A and 5B the still unexposed film 25 is rolled up in a known manner on a feed spool 26, from which the film runs via a reversing roll 27 and a measuring roll 28 to a film contact plate 29 located behind the light-path opening 22. The film contact plate 29 is acted on by a spring 30 which tends to press the plate 29, and thus the film 25, against the film guide runners 31, i.e., so as to hold the film flat in the area of the light-path opening 22. The guide runners 31 extend along the longitudinal edges of the light-path opening 22. After crossing the contact plate 29, the film 25 extends to a further reversing roll 32, from which the film is guided between a guide plate 33 and the inside of the lid 23A to a wind-up spool 34 which is located near the feed spool 26.

According to FIG. 5B the end of the spring 30 opposite the contact plate 29 is supported by a flange 35, which itself is supported via a cylindrical ring 36 against guide plate 33. An annular disk 37 is rotatably mounted within the cylindrical ring 36, this ring 36 on the one hand fitting against flange 35 and on the other hand having helical-shaped gliding surfaces 38 which fit against corresponding helical-shaped sloping surfaces 39 of a support plate 40 which is held by means of a central bolt 41 attached to contact plate 20. The support plate 40 is secured against rotation around bolt 41 by at least one radial projection 42 of the support plate engaging with an axis-parallel groove 43 on the inside of the cylindrical ring 36. The ring disk 37 has an arm 44 which projects radially outwardly through an opening in the cylindrical ring 36 and is swivellably connected by means of a joint peg 45 with one end of guide rod 46. The other end of the guide rod 46 (not visible in the drawing) is coupled with the armature of an electromagnet 47. The ring disk 47 is limitedly rotatable in one or the opposite direction with the help of the electromagnet 47, as a result of which the support plate 40 is either urged by means of the gliding surfaces 38 and 39 in the direction toward the guide plate 33 or is released for movement in the direction away from the guide plate 33. In the first mentioned case the movement of the support plate 40 is transmitted via the bolt 41 to the contact plate 29 so that the latter is lifted off the guide runners 31 against the action of spring 30 and the film 25 is not pressed against the guide runners 31. On the other hand, in the second case the bolt 41 and the contact plate 29 are permitted to be moved by spring 30 towards the front wall 21 of the housing 20, whereby the film 25 is pressed by the contact plate 29 against the guide runners 31. The parts 29, 30 and 35 to 47 together form the film contact device, which may be activated or de-activated by means of magnet 47 and may be lifted out of the housing 20 as a constructional unit when the lid 23A is opened, i.e., in order to facilitate the insertion of the film 25.

Figure 5A:
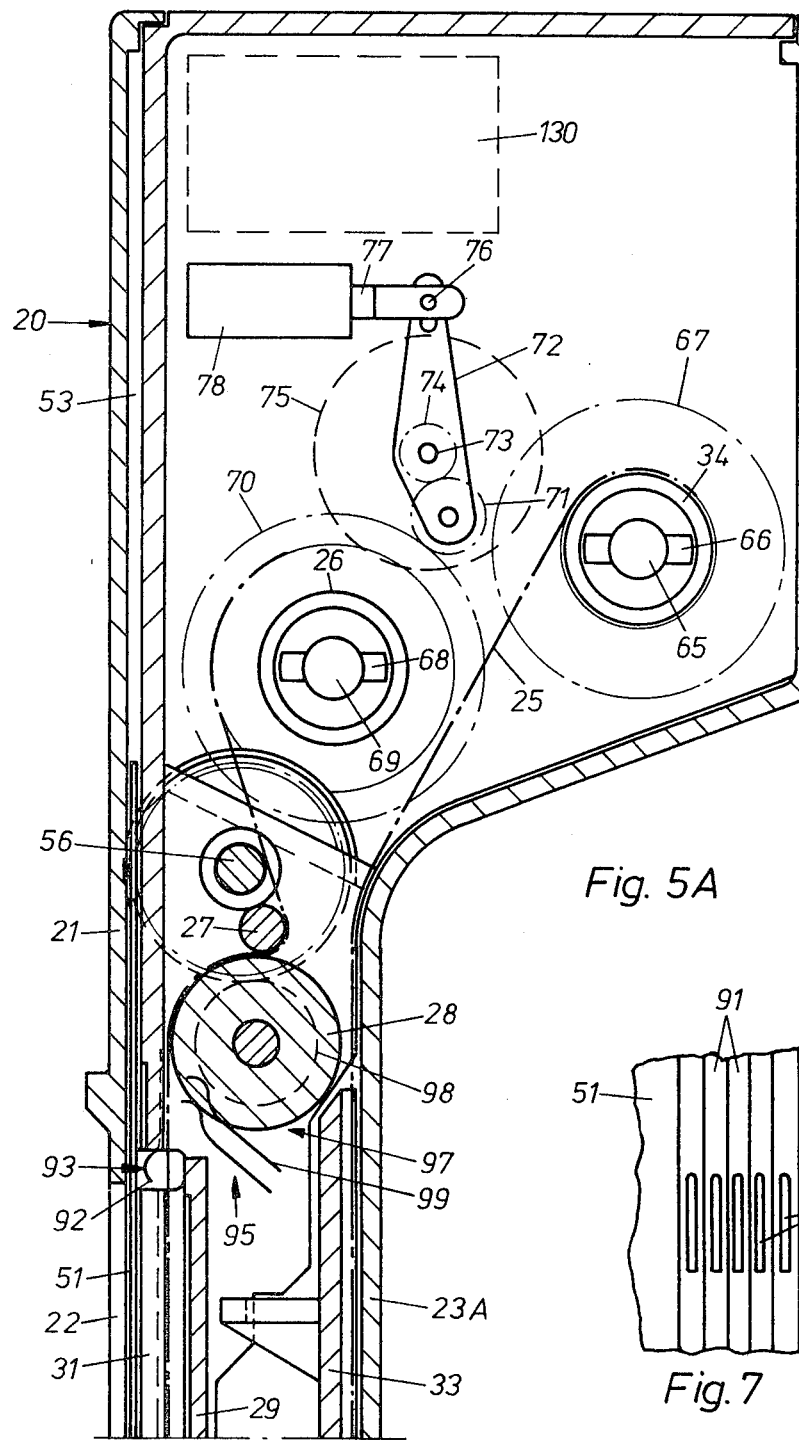
Figure 7:
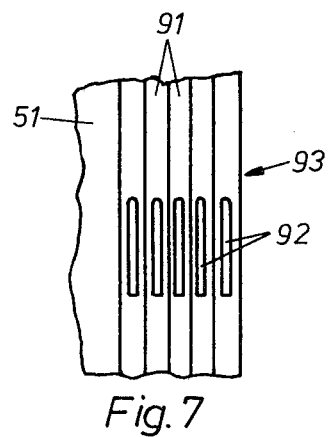
FIG. 7 schematically represents a transducer for producing an electrical signal, many such transducers being used in the inventive apparatus.
Figure 6:
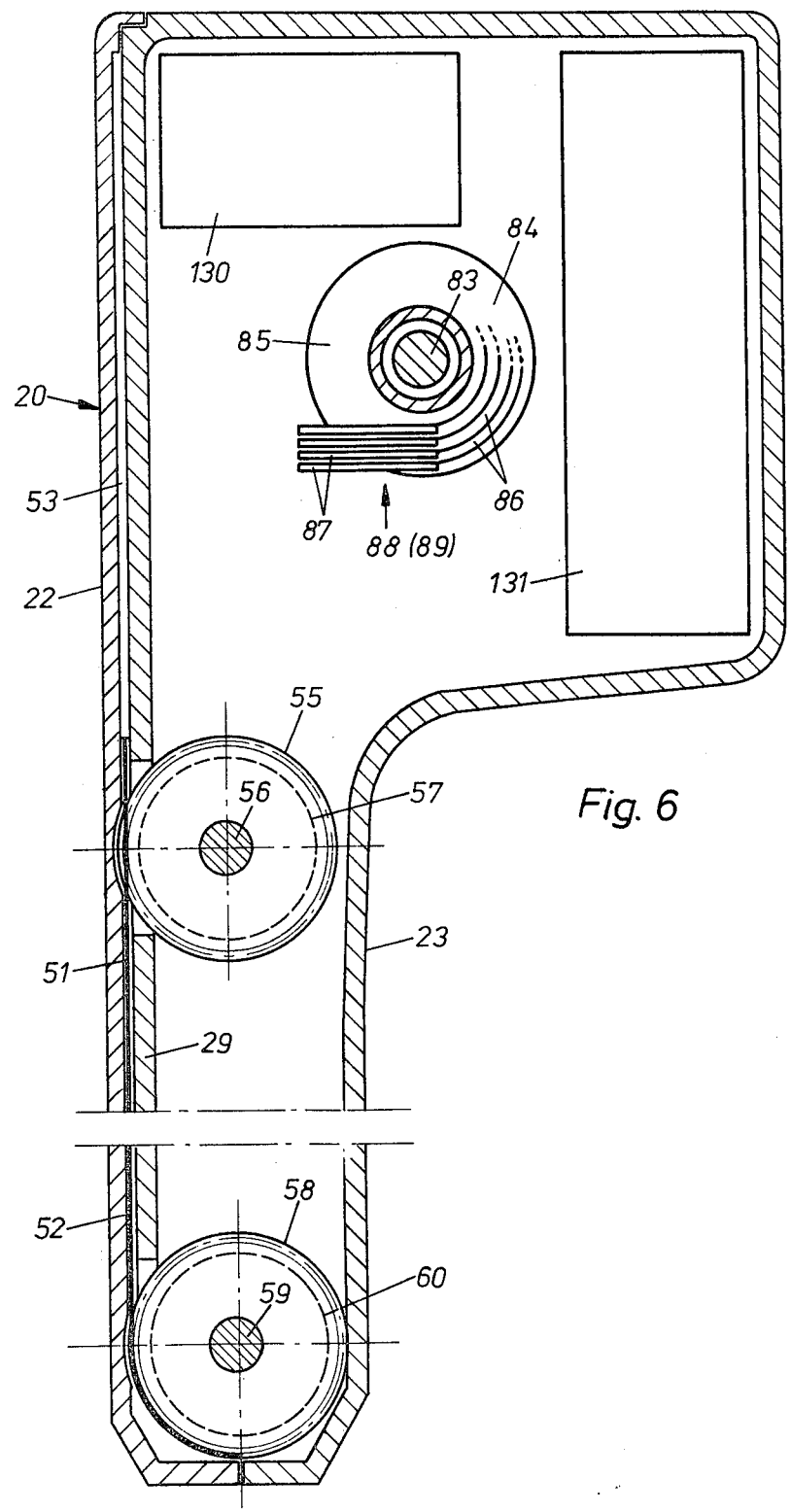
FIG. 6 shows parts of an analogous sectional view taken along line 6—6 of FIG. 3.

In FIGS. 5A, 5B and 6 it is evident that a mask consisting of two parts 51 and 52 is disposed immediately in front of the film 25 and behind the housing front wall 21. Each mask part 51 and 52 consists of a foil-like, light-impermeable material, such as, e.g., steel sheet, and is dimensioned such that it may cover up practically the entire light-path opening 22. One mask part 51 is guided in a pair of opposite grooves 53 which permit the movement of this part of the mask to a location completely out of the area of the light-path opening 22. The other mask part 52 is guided in an analogous manner in a pair of opposite grooves 54 which likewise make is possible for this mask part to be moved completely out of the area of the light-path opening 22. While the grooves 53 for the mask part 51 extend in a straight line, the grooves 54 for the mask part 52 extend in a bent (U-shaped) fashion around the deflecting roll 32 and partly along the rear wall 23 or the lid 23A of the housing 20. The direction of shiftability of the two mask parts 51 and 52 is parallel to the longitudinal direction of the film 25, at least in the area of light-path opening 22.

There are two disks 55, each of which is toothed on its periphery for the drive movement of the mask part 51. Only one disk 55 is visible in FIG. 6. The disks 55 are seated on a shaft 56 which is rotatably mounted in the housing 20, the shaft 56 being coupled via a reduction gear (not shown) with an electromotor 57, the rotational direction of which is reversible. The teeth on the periphery of the disks 55 engage with two rows of perforations which are disposed along the longitudinal edges of mask part 51 so that the mask part is shiftable along the guide grooves 53 by means of the electromotor 57. Analogously, two disks 58, each of which is toothed on its periphery, are provided for the drive movement of the mask part 52. Only one disk 58 is visible in FIG. 6. The disks 58 are seated on a shaft 59 on which the already mentioned reversing roll 32 is freely rotatable. The shaft 59 is coupled with an electromotor 69 (FIG. 6) via a reduction gear (not shown), the rotational direction of which is reversible. The teeth of disks 58 engage with a pair of rows of perforations which are disposed along the two longitudinal edges of the mask part 52 so that the mask part 52 is shiftable along the guide grooves 54 by means of the electromotor 60. The perforations in each of the two mask parts 51 and 52 are outside the light-path opening 22 and are covered up by the foreward wall 21 of the housing 20. The two mask parts 51 and 52 may be arbitrarily moved by the electromotors 57 and 60 into a position completely closing the light-path opening 22, in which case the film 25 is shielded from exposure to incident light, or they may be moved into any open position, whereby a picture window is provided for producing a photographic picture between the mutually facing transverse edges of the mask parts. It is obvious that both the format of the picture window left open by mask parts 51 and 52, as well as its position within the light-path opening 22, insofar as the format is smaller than the opening 22, are variable within wide limits and freely selectable.

As shown in FIG. 5A, a stump 65 of a shaft, which projects in a known manner into an axial end of the wind-up spool 34, is provided with radial driver vanes 66. The shaft stump 65 is rotatably mounted in the housing 20 and carries a gear 67 which is firmly connected with the above-mentioned shaft stump. Analogously, a shaft stump 69, which is provided with driver vanes 68, projects into the unwinding spool 26 and is rotatably mounted in the housing 20. It also carries a gear 70. A gear pinion 71 is rotatably mounted on a rocker arm 72 so that alternately either the gear 67 or the gear 70 may be brought into engagement with pinion 71. The rocker arm 72 is swivellably mounted on a shaft 73 which carries another gear pinion 74 that is always in engagement with the pinion 71. The shaft 73 is coupled with an electromotor 75 via a reduction gear (not shown) through which, depending on the swivel-position of the rocker arm 72, the wind up spool 34 or the unwinding spool 26 may be driven in order to transport the film 25 forward or backward. The rocker arm 72 is connected with the armature 77 of an electromagnet 78 stationarily disposed in the housing 20 by means of joint pegs 76, with the help of which the rocker arm 72 may be swivelled.

The FIGS. 1, 3 and 4 show that there are two rotary knobs 81 and 82 coaxially disposed on one lateral wall 80 of the housing 20, one of which is rotatably mounted by means of a hollow shaft 84 (which surrounds shaft 83). According to FIG. 6, the hollow shaft 84 carries a code disk 85 which is provided with several concentrically disposed code tracks 86. These are constructed in a known manner, each including several electrically conductive and electrically insulating sectors (not shown). An electrical sliding contact element 87 is assigned to each code track 86 and is fastened in electrically insulated fashion in housing 20. Depending on the pertinent rotary position of the code disk 85, different combinations of the sliding contact elements 87 are connected with a ground bus wire so that the existing state of switching reflects the rotary position of the code disk 85 and of the rotary knob 82 connected with it. The elements 85, 86 and 87 together thus form a mechanical-electrical transducer 88 for the production of an electrical signal defining the pertinent rotary position of knob 82. The shaft 83 also carries a code disk (not shown) with code tracks in a completely analogous manner and to which always one sliding contact element is assigned for the purpose of forming a second transducer 89 for the production of an electrical signal which defines the specific rotary position of knob 81.

The side of the mask part 51 (FIG. 5A) facing the inside of housing 20 is provided with several code paths 91 (FIG. 7) which run parallel to the direction of shifting of the mask part and consist in a known manner of several mutually electrically-conductive and electrically-insulating sectors (not shown). An electrical sliding contact element 92 (FIGS. 5A and 7) is associated with each of these code tracks 91 and is fastened in electrically insulated fashion in the housing 20. Various combinations of the sliding contact element 92 are connected, based on the specific sliding position of the mask part 51, with a mass conductor so that the existing switching state reflects the position of the mask part 51. The code paths 91 and sliding contact elements 92 together form a mechanical-electrical transducer 93 for the production of an electrical signal defining the specific position of the mask part 51. A mechanical-electrical transducer 94 is also associated in the same manner to the other mask part 52, of which only one of the sliding contact elements is visible in FIG. 5B. This transducer 94 produces an electrical signal defining the specific position of the mask part 52.

According to FIG. 5A, another mechanical-electrical transducer 95 for the production of an electrical signal is associated with the measuring roll 28 to provide a measure of the forward and reverse travel of the film 25. This transducer is, for example, formed by an endless row of electrically conductive and insulating zones disposed on the periphery of the measuring roll 28, as well as a sliding contact element fastened in electrically insulated fashion in the housing 20, and is connected with a ground bus wire via one of the conductive zones.

The measuring roll 28 is furthermore coupled via a reduction gear (not shown) with an additional mechanical-electrical transducer 97 (FIG. 5A) which has several rotating code path carriers 98 and several sliding contact elements 99 associated with the code paths, which are attached in electrically insulated fashion in housing 20. The code path carrier 98 rotates by somewhat less than 360° whenever the longest commercial roll film runs over the measuring roll 28 and drives the latter. The transducer 97 produces an electrical signal which reflects the remaining length of film still available for photographic pictures. Roll films with two different lengths are on the market, namely type "220" and type "120". When inserting film 25 into the device described, the code path carrier 98 must always be brought into a certain starting or zero position which is different for each of these lengths of film. Effectively, there are two different markings, designated by "220" or "120", in order to easily recognize the valid zero position and be able to set it. However, a different embodiment is also possible wherein there is only one zero position of the code path carrier 98, and an electrical switch is provided for the program reversal of the microprocessor 130 to variable lengths of film. Furthermore, the code path carrier 98 may be constructed for an endless, cyclic operation, whereby during loading of the housing 20 with light-sensitive film 25, the momentary position of the code path carrier 98 is read into the microprocessor 130 as a zero position at the same time that the photographer programs the microprocessor for the specific film length. As a result, any zero positioning of the code path carrier 98 is superfluous.

According to FIGS. 1 and 2, a peg 101 or 102 is movably positioned in the lateral walls 80 and 80A of the housing 20 so as to be positioned in a retracted state in the pertinent housing wall or in a position projecting laterally from the housing as indicated by dash-dot lines in FIG. 4. The pegs 101 and 102 serve to lock the device in its position of use, i.e., when fastened to the rear part of a ground glass camera. The two pegs 101 and 102 are coupled mechanically in a manner (not shown) so that when moved they execute counter directed movements, i.e., they travel either simultaneously outwardly or simultaneously inwardly. The pegs 101 and 102 are coupled with the armature of an electromagnet 103 in a manner not shown, but indicated in FIG. 4, to provide the drive for movement of the pegs.

FIGS. 3 and 4 show that an additional peg 105 projects from the lower end of housing 20, this peg being movably guided in the pertinent housing wall so that it may be moved either into a position projecting from the housing or else into a retracted position within the housing. The peg 105 serves as an operating element of an electrical switch 106. A spring (not shown) acts to move the switch 106 into an open position and the peg 105 into its position projecting from the housing. Whenever the described device is correctly attached to a camera, the peg 105 is forced back into the housing 20 by an associated stop on the camera to move against the force of the spring, and thus the electrical contact of switch 106 is closed.

Likewise at the lower end of housing 20 there in an internal electrical plug-contact 107. This plug contact serves for establishment of an electrical connection for closing the camera, as will be explained in more detail on the basis of FIG. 8.

According to FIG. 3 an optical-electrical transducer 110, e.g., a phototransistor, has been inserted into the front wall 21 of housing 20 beside the light-path opening 22, the function of which is described below.

FIG. 4 shows that two windows 111 and 112 are located in the upper part of the rear wall 23 of housing 20 in order to display two signalling devices. The signalling device 113, which is visible in one window 111, serves for the digital recording of the format of the picture window left open by the mask parts 51 and 52 and selected by means of the rotary knob 81; for the digital recording of the possible decentration 113, which is visible in one window 111, serves for the digital recording of the format of the picture window left open by the mask parts 51 and 52 and selected by means of the rotary knob 81; for the digital recording of the possible decentration of the specific picture window within the fixed light-path opening 22 selected by the rotary knob 82, i.e., for the recording of the deflection of the center-point of the selected picture window from the center of the fixed light-path opening 22; as well as for the digital recording of the remaining length of still unexposed film 25. The recording device 114, visible in the other window 112, is used for the analogous recording of the pertinent position of the mask parts 51 and 52, i.e., with reference to the fixed light-path opening 22. For this purpose the contour of the window 112 is geometrically shaped to correspond with that of the fixed light-path opening 22. The recording device 114 includes a number of strip-like liquid crystals or illuminating diodes which extend transversely to the longitudinal direction of window 112. Two of these strip-like liquid crystals or illuminating diodes, e.g., elements 115 and 116, when in their energized state, mark the mutually facing terminal edges of the mask parts 51 and 52, which define the transverse edges of the picture window. The field between the above-mentioned two liquid crystals or illuminating diodes 115 and 116 will provide a geometrically similar picture to the addition, more of the strip-like liquid crystals or illuminating diodes may be energized which lie either outside or inside of the previously-mentioned field.

A manually-operated push button 118 can also be seen in FIG. 4, which is the operating element of an electrical switch 119. A spring (not shown) acts to move the switch 119 into switched-off position. The switch 119 is operated by the photographer whenever he wishes to manually trigger film movement.

According to FIG. 2, an operating element 121 of an electrical switch 122 is disposed on the side wall 80A of the housing 20 opposite the rotary knobs 81 and 82, which permits the photographer to make an automatic double exposure lock selectively active or inactive, as shall yet be explained later. Finally, two more individually operable push buttons 123 and 124, which are the operating elements of electrical switches 125 and 126, are also disposed on the side wall 80A. These are under the influence of springs (not shown) which constantly act to move the switches back into their starting, switched-off positions. The switch 125 serves to switch on the electrical feed of the device described, whereas the other switch 126 turns off the electrical feed as described further below.

An electronic logical circuit module 130 (FIG. 6), e.g., in the form of a microprocessor with several signal inlets and signal outlets, as well as a circuit arrangement 131 for the electrical feed of the apparatus, are in the upper part of the housing 20. Details of the logical circuit module 130 and of the circuit arrangement 131 are apparent from FIGS. 9 to 12, which will be referred to in the following paragraphs.

Figure 9:
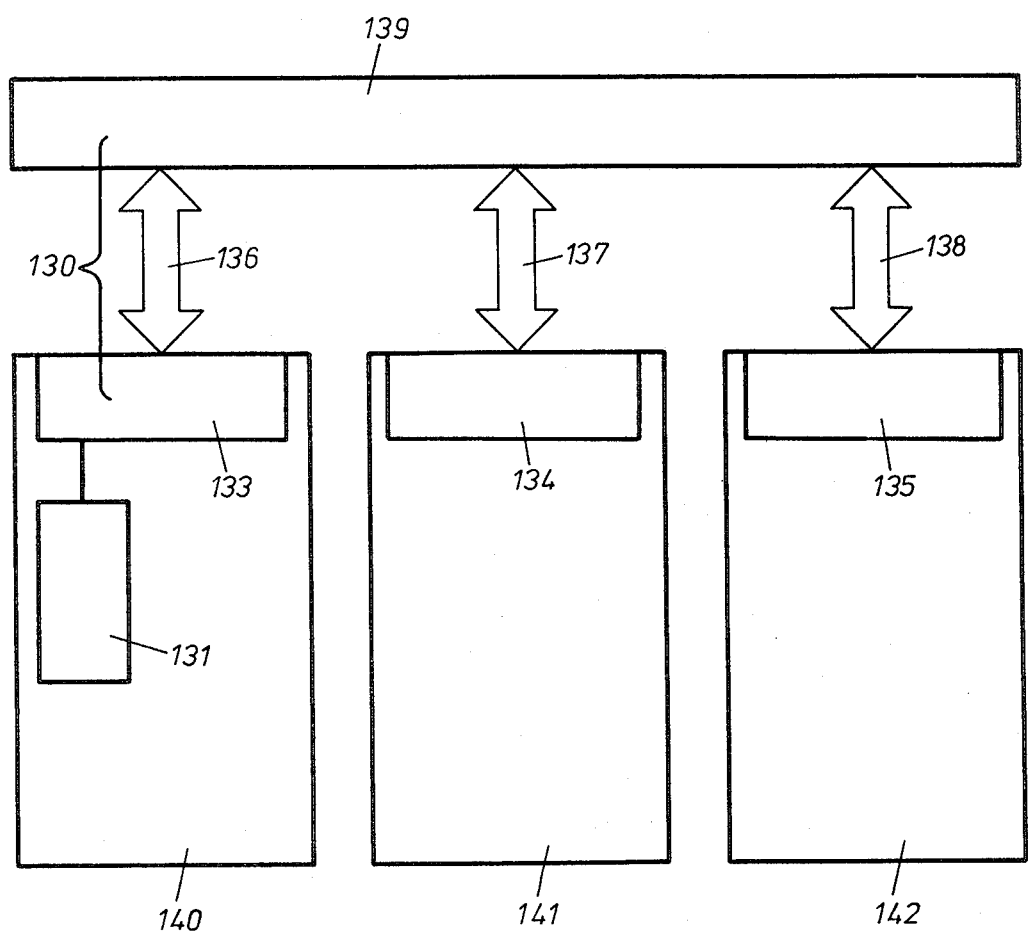
FIG. 9 is a block circuit diagram of the electrical components of the apparatus shown in FIGS. 1 to 7.

According to block circuit diagram in FIG. 9, the logical circuit module 130 has a first microprocessor unit 133, of, e.g., the commercial type CPU F 3850 of Fairchild Camera & Instrument Corp., San José, Calif., U.S.A., a second microprocessor unit 134 of, e.g., the type PIO F 3861 of the same firm, and a third microprocessor unit 135, e.g., of the type PSU F 3851 of the same firm. Each of these microprocessor units 133 to 135 is connected by way of an individual bi-directional data transmission path 136, 137 or 138 with a collecting line 139 for bi-directional data transmission. The blocks designated 140, 141 and 142 in FIG. 9 symbolize electrical circuits which are shown individually and in more detail in FIGS. 10, 11 or 12.

Figure 10:
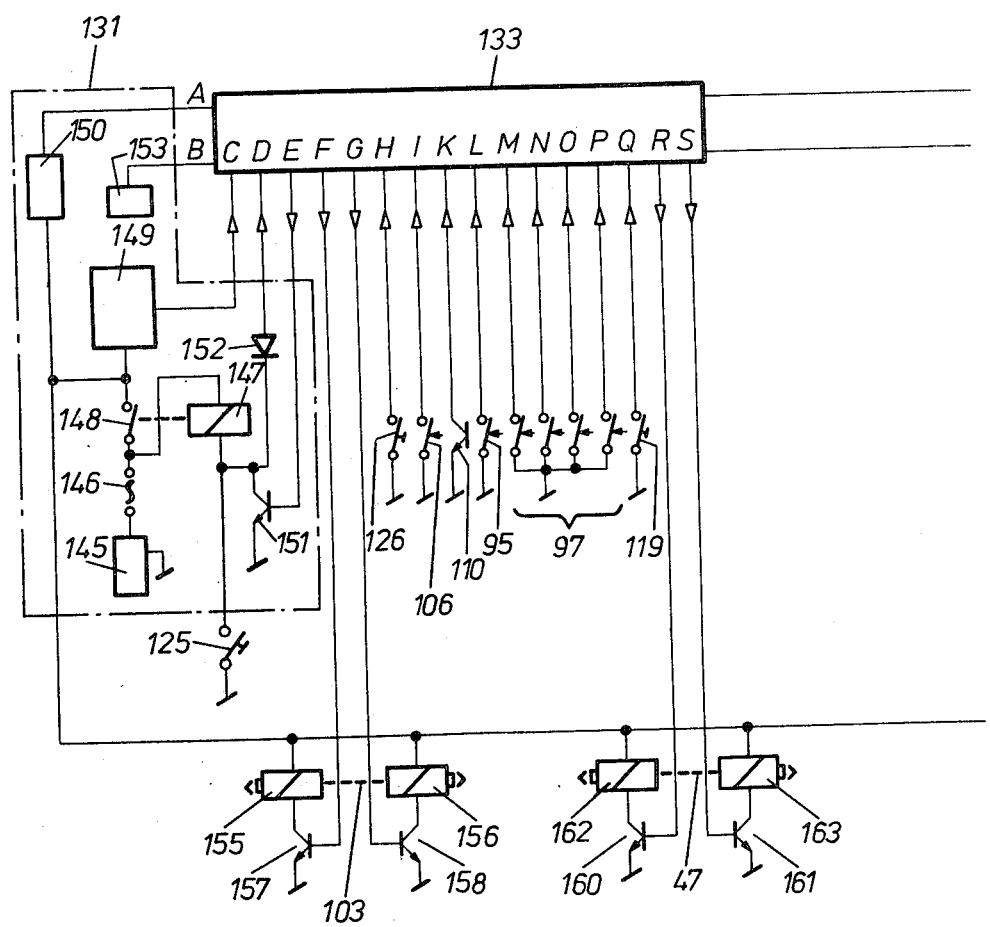
FIGS. 10, 11 and 12 each show details of the components of the block circuit diagram illustrated in FIG. 9.

In FIG. 10, which shows the details of block 140 (FIG. 9), the first microprocessor unit 133 and the circuitry 131 provided for the electrical feed can be seen. The latter has an accumulator 145 which serves as a power source, a fuse 146, a relay 147 with a pertinent operating contact 148, a voltage monitoring device 149, a voltage regulator 150, a transistor switch 151, a decoupling diode 152 and a time generator 153 for the control of the microprocessor. The switch 125, which was mentioned with reference to FIG. 2 for turning on the electric feed, is connected in parallel with the emitter-collector section of the transistor 151. An inlet A of the microprocessor unit 133 is connected with the voltage regulator 150, an inlet B with the time generator 153, an inlet C is connected with the voltage monitoring device 149, and an inlet D, by way of diode 152, with the collector of the transistor 151. An outlet E of the microprocessor unit 133 is connected with the base of the transistor 151. Switch 126, which has likewise been previously mentioned for turning off the electrical feed, is connected to an inlet H of the microprocessor unit 133.

Furthermore, two oppositely-acting magnet coils 155 and 156 of the electromagnet 103, previously mentioned in relation to FIG. 4 for operation of locking pegs 101 and 102, may be seen in FIG. 10. A switching transistor 157 or 158 is associated with each magnet coil 155 or 156, the base of which is connected with a signal outlet F or G of the microprocessor unit 133. A signal inlet I of unit 133 is connected with switch 106, also indicated in FIG. 3, which is closed by means of peg 105 whenever the device is correctly fastened to the rear part of the camera.

FIG. 10 shows, furthermore, that a signal inlet K of the microprocessor unit 133 is connected with the optical-electrical transducer 110, which has been previously mentioned with respect to FIG. 3, and that an additional signal inlet L of unit 133 is connected with the transducer 95 described in relation to FIG. 5A for producing the signal reflecting the travel path of film 25. Additional signal inlets, M, N, O and P of the microprocessor unit 133 are connected to the transmitter 97 (FIG. 5A) for producing the electrical signal reflecting the specific remaining length of film 25. The switch 119 for starting the movement of film 25, previously mentioned with respect to FIG. 4, is connected with another signal inlet Q of the microprocessor unit 133. Finally, two signal outlets R and S of unit 133 are respectively connected with the base of a switching transistor 160 and 161. These transistors 160 and 161 each lie in the current path of one of two oppositely-acting magnet coils 162 and 163 of the electromagnet 47, previously described with respect to FIG. 5B, for activating and deactivating the film contact plate 29.

Figure 11:
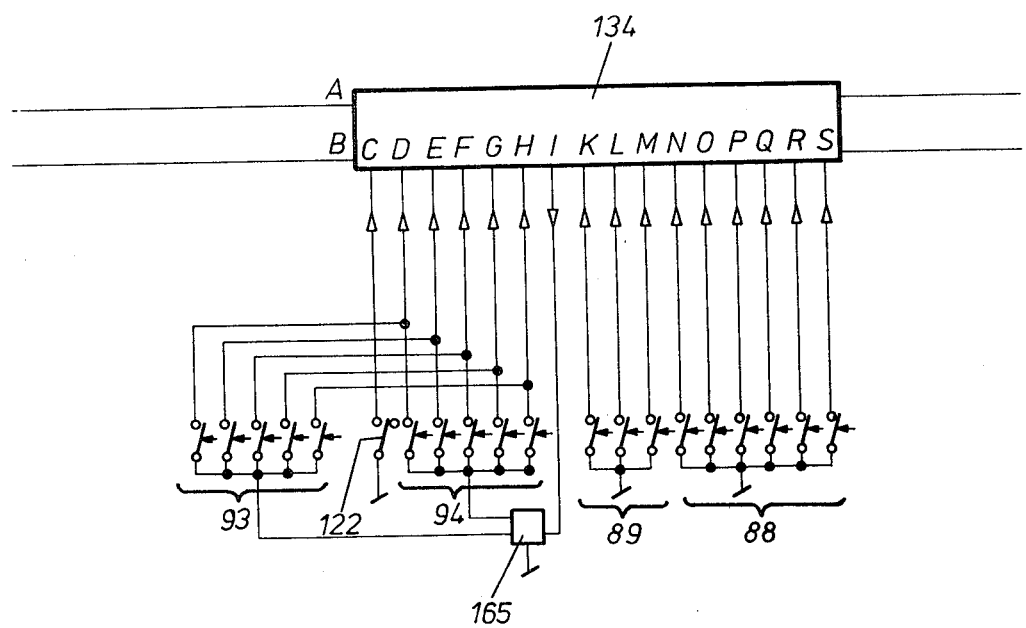

The second microprocessor unit 134 is illustrated in FIG. 11, which shows the details of block 141 (FIG. 9). Its inlets A and B are connected with the circuitry 131 for the electrical feed, just like the equally designated inlets of the first unit 133. The microprocessor unit 134 has a signal inlet C which is connected to the electrical switch 122 for activating and deactivating the double exposure lock, already described with respect to FIG. 2. Additional signal inlets D, E, F, G and H of unit 134 are connected with the two transducers 93 and 94, which are associated with the two mask parts 51 and 52 and produce electrical signals defining the pertinent position of these mask parts. These same transducers 93 and 94 are connected on the other hand to an electronic change-over switch 165, which may be controlled by an electrical signal from an outlet I of the microprocessor unit 134 so that alternately only the transducer 93 or the transducer 94 is connected to the ground bus wire and thus becomes active, while the other of these transducers is inactive. The microprocessor 130 contains registers in which the electrical signals produced alternately by means of the two transducers 93 and 94 may always be stored until the position of the mask parts 51 and 52 is changed. Additional signal inlets K, L and M or the microprocessor unit 134 are connected with the transducer 89, which is adjustable with the rotary knob 81, and serves for producing the signal reflecting the selected format of the picture window. Finally, there also are signal inlets N, O, P, Q, R and S, which are connected with the transducer 88, which itself can be adjusted with rotary knob 82, and which serves for the production of the signal reflecting the selected decentration of the picture window in relation to the center of the fixed light-path opening 22.

Figure 12:
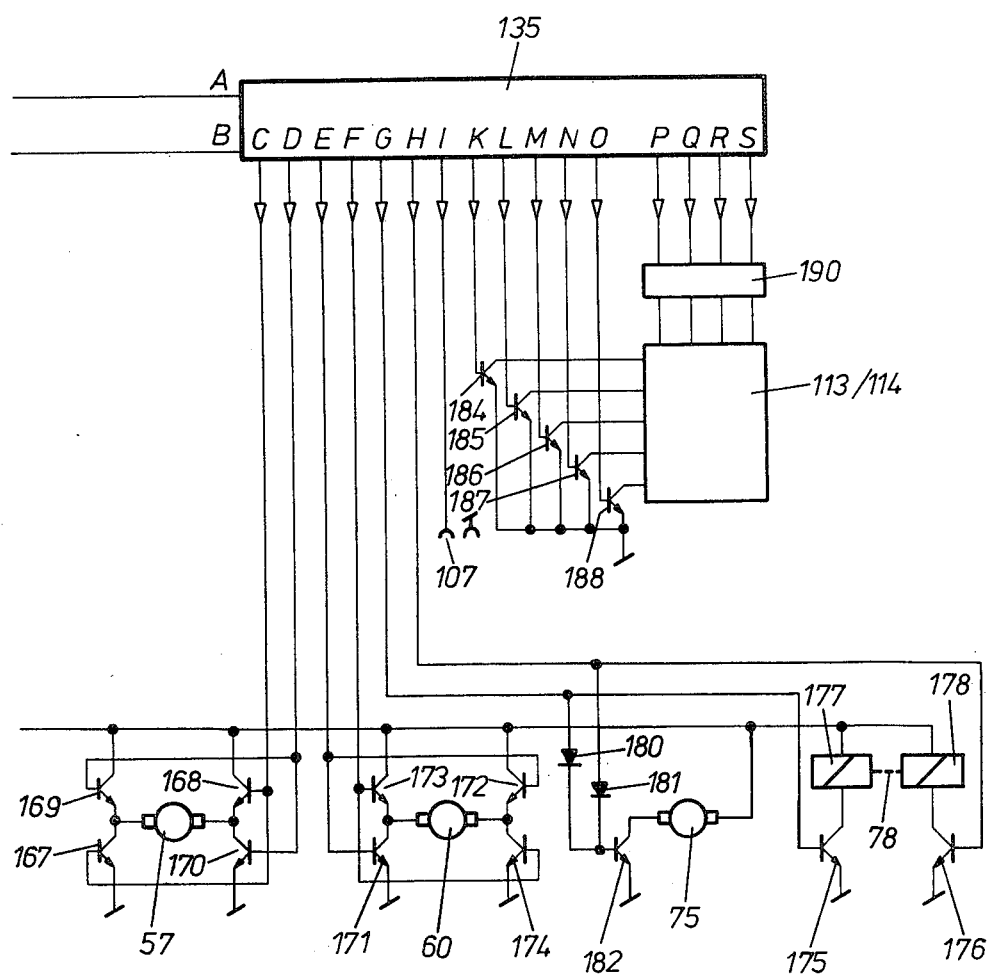

The third microprocessor unit 135, the inlets A and B of which are connected with the circuitry 131 provided for the electrical feed similarly to the inlets of the first unit 133, is illustrated in FIG. 12, which shows the details of the block 142 (FIG. 9). The third microprocessor unit 135 has signal outlets C and D which are connected with the base of two switching transistors 167 and 168 or 169 and 170. The collector-emitter section of the four transistors 167 to 170 are connected as branches of a bridge, in the diagonals of which lies the electromotor 57 for the transport drive of the mask part 51. Depending on whether a control signal occurs at the outlet C or the outlet D of the microprocessor unit 135, the motor 57 runs in one or the other rotational direction in order to move the mask part 51. Whenever there is no control signal on any of the outlets C and D, the motor 57 will stand still. In an entirely analogous way, the electromotor 60 is switched for transport drive of the mask part 52 into the diagonal of a bridge, the branches of which are formed by four switching transistors 171, 172, 173 and 174. Two signal outlets E and F of the microprocessor unit 135 are always connected with the bases of two of the mentioned transistors 171 to 174 so that the motor 60 may be put in operation in one or the other rotational direction by a control signal at the outlet E or the outlet F, i.e., in order to adjust the mask part 52. Two additional signal outlets G and H of unit 135 are each connected with the bases of a switching transistor 175 or 176. These transistors 175 and 176 are in the current path of two oppositely acting magnet coils 177 and 178 of the electromotor 78, which was described with respect to FIG. 5A, and serve for reversing the gear 67, 70, 71 for the drive of the wind up spool 34 or the fee spool 26. The same signal outlets G and H are always connected via a decoupling diode 180 or 181 with the base of a switching transistor 182, the collector-emitter section of which lies in the current path of the electromotor 74 for the film movement, shown in FIG. 5A. Depending on whether a control signal occurs on the outlet G or on the outlet H, either the magnet coil 177 or the magnet coil 178 is energized, whereby at the same time the motor 75 is put in operation in a predetermined rotary direction. Whenever there is no signal at the outlets G and H, motor 75 stands still.

Furthermore, it is apparent in FIG. 12 that a signal outlet I of the microprocessor unit 135 is connected with an electrical plug contact 107, shown in FIG. 3. Additional signal outlets K, L, M, N and O of unit 135 are attached to the base of an associated transistor 184, 185, 186, 187 or 188. These transistors 184 to 188 are associated with the electro-optical signalling devices 113 and 114, which have already been described in relation to FIG. 4. Finally, additional signal outlets P, Q, R and S of the microprocessor unit 135 are likewise connected with the signalling devices 113 and 114 by way of a decoder 190.

As has already been mentioned, the described apparatus of the invention is used with a commercial camera, as schematically in FIG. 8, and explained subsequently. According to FIG. 8, the ground glass camera, designated by 200, has a forward camera part 201 with an optical lens 202 and a shutter 203, a rear camera part 204 with a guide frame 205 for the cassette, a frame for the ground glass 206, as well as a bellows 207 interconnecting the front and the rear camera parts. As is customary with ground glass cameras for professionals, the ground glass frame 206 is moveably connected with the guide frame 205 for the cassette by means (not shown) in such a way that the ground glass frame, during insertion of a cassette of negatives or of the housing 20 of the inventive apparatus, is merely forced backwardly, and upon removal of the cassette or of the housing 20, automatically resumes contact with the guide frame 205 for the cassette. An electrical or mechanical release 208 is associated with the shutter 203 which preferably also permits the opening of the shutter in order to observe the picture on the ground glass and to close it before a photographic picture is taken. Finally, the shutter 203 is also constructed such that it may be locked in its closed state by an electrical signal, which is fed in via a line 209. The line 209 is connected to an electrical plug connection 210 disposed on the guide frame 205 for the cassette, which is in contact with the plug connection 107 disposed on housing 20 whenever the housing 20 is fastened to the guide frame 205 for the cassette instead of a cassette of negatives.

OPERATION OF THE DESCRIBED DEVICE

Let us assume that the apparatus of the invention is loaded with an unexposed, light-sensitive film 25 and that the two mask parts 51 and 52 are in a position completely closing the fixed light-path opening 22 so that no light strikes the film 25.

In order to activate the apparatus, the photographer operates the pressure button 123 (FIG. 2), as a result of which the switch 125 is temporarily closed. The circuit diagram in FIG. 10 shows that upon closing the switch 125, the relay 147 is connected with the power source 145. The operating contact 148 of relay 147 thereupon closes the supply circuit to the microprocessor units 133, 134 and 135 and to the remaining consumers of power of the apparatus. At the outlet E of the first microprocessor unit 133 there now appears a control signal which moves the transistor 151 into a conductive state. After releasing the push button 123, the transistor 151 consequently keeps the energizer circuit of the relay 147 closed so that the supply with electrical energy to the apparatus is maintained.

Independently of whether the housing 20 is fastened to the camera 200 or not, the format desired for a photograph may be selected by means of the rotary knob 81 (FIG. 1). The transducer 89 (FIG. 11), which is coupled with the rotary knob 81, is operated by means of the latter, and this transducer causes an electrical signal which reflects the selected format to develop at the inlets K, L, M of the second microprocessor unit 134. The pertinent selected format is recorded digitally by the electrical-optical recording device 113 (FIGS. 4 and 12). Analogously, the photographer may select by means of the rotary knob 82 (FIG. 1) a possibly desired decentration of the picture window within the fixed light-path opening 22 wherein the transducer 88 (FIGS. 6 and 11), which is coupled with the rotary knob, causes an electrical signal to develop at the inlets N and S of the microprocessor unit 134, which reflects the specific setting of the rotary knob 82. The specific selected decentration is digitally recorded by the recording device 113. As long as light strikes the optical electrical transducer 110 (FIGS. 3 and 10) on the front wall 21 of the housing 20, i.e., whenever the housing 20 is not fastened to the camera 200, or whenever the shutter of the camera remains open, the transducer 110 will deliver an electrical signal to inlet 11 of the first microprocessor unit 133 which locks the mask parts 51 and 52 in their position completely closing the light-path opening 22, i.e., independently of whether the switch 106 is operated or not by means of the peg 105.

Figure 14:
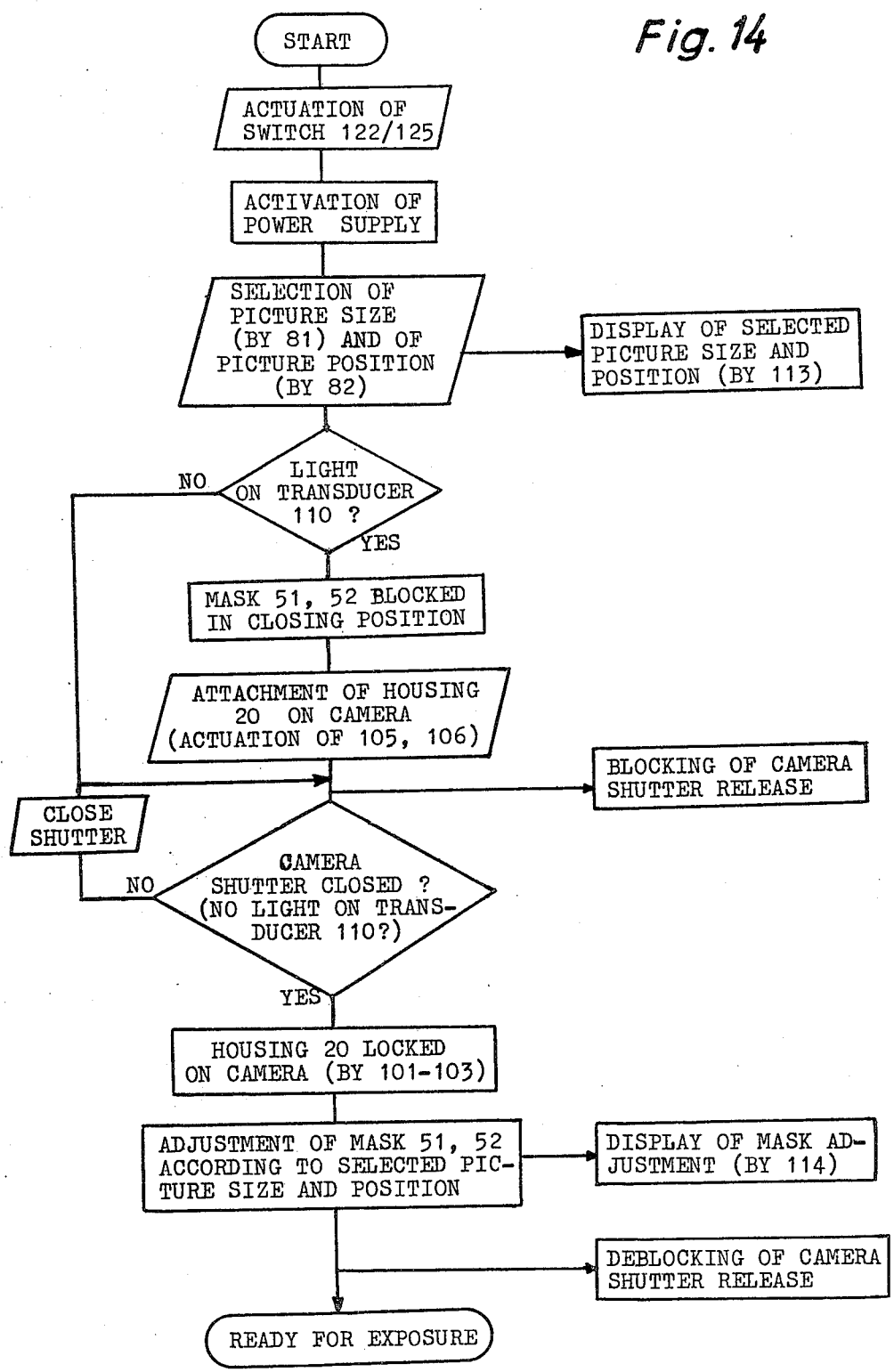
FIG. 14 shows a flow chart schematically illustrating the various steps for activating the device according to FIGS. 1-12 and for attaching it to a photographic camera in order to ready the device for photographic exposures.

Whenever the housing 20 has been attached correctly to the guide frame 205 of the cassette for the camera 200 and has been closed by means of peg 105 of the switch 106 (FIGS. 3 and 10), an electrical signal appears at the outlet I of the third microprocessor unit 135 (FIG. 12), which locks the camera shutter in its closed state via plug connection 107, 210 and the electrical line 209 (FIG. 8). In case of a closed camera shutter 203, no light will strike the optical-electrical transducer 110. Now a control signal appears at the outlet F of the first microprocessor unit 133 (FIG. 10) which brings the transistor 157 into its conductive state, as a result of which the magnet coil 155 of the electromagnet 103 is energized. As a result, the locking pegs 101 and 102 (FIG. 4) are moved outwardly in order to lock the housing 20 on the camera. Immediately thereafter, the mask parts 51 and 52 are automatically moved into open positions so that the picture window determined by the mask parts will agree with the preselected format and the possibly preselected decentration in relation to the center of the light-path opening 22. The movement of the mask parts 51 and 52 from their closing position into the selected open position is accomplished with the help of the electromotors 57 and 60, which are triggered by electrical control signals from the outlets C, D, E and F of the third microprocessor unit 135. The transducers 93 and 94 (FIGS. 5A, 5B and 11) associated with the mask parts 51 and 52 are operated simultaneously with the movement of the latter. The transducers cause electrical signals to develop at the inlets C to H of the second microprocessor unit 134, which reflect the pertinent actual position of the two mask parts 51 and 52. As has already been mentioned, the two transducers 93 and 94 operate on joint signal inlets of unit 134. The two transducers 93 and 94 are activated alternately in quick succession by means of the electronic change-over switch 165 based on a signal at the outlet I, and the electrical signals occurring at the inlets C to H are stored into two registers of the microprocessor 130. As soon as the signals stored thus and reflecting the pertinent actual position of the mask parts 51 and 52 agree with the theoretical values preselected by means of the rotary knobs 81 and 82, the motors 57 and 60 are turned off and thus the mask parts are stopped. The actual position of the mask parts 51 and 52 is visually recorded by the analogue-recording device 114. The mask parts 51 and 52 are now in an open position whereby the picture window left open by the mask parts has the format selected by means of the rotary knob 81. Simultaneously with the turning off of the motor 57 and 60, a signal appears at outlet I of the third microprocessor unit 135 which unlocks the camera shutter 203 by way of the plug connection 107, 210 and the electrical line 209 in order to enable the photographer to carry out an exposure process. The various steps of operation described above are schematically illustrated in FIG. 14.

Figure 15:
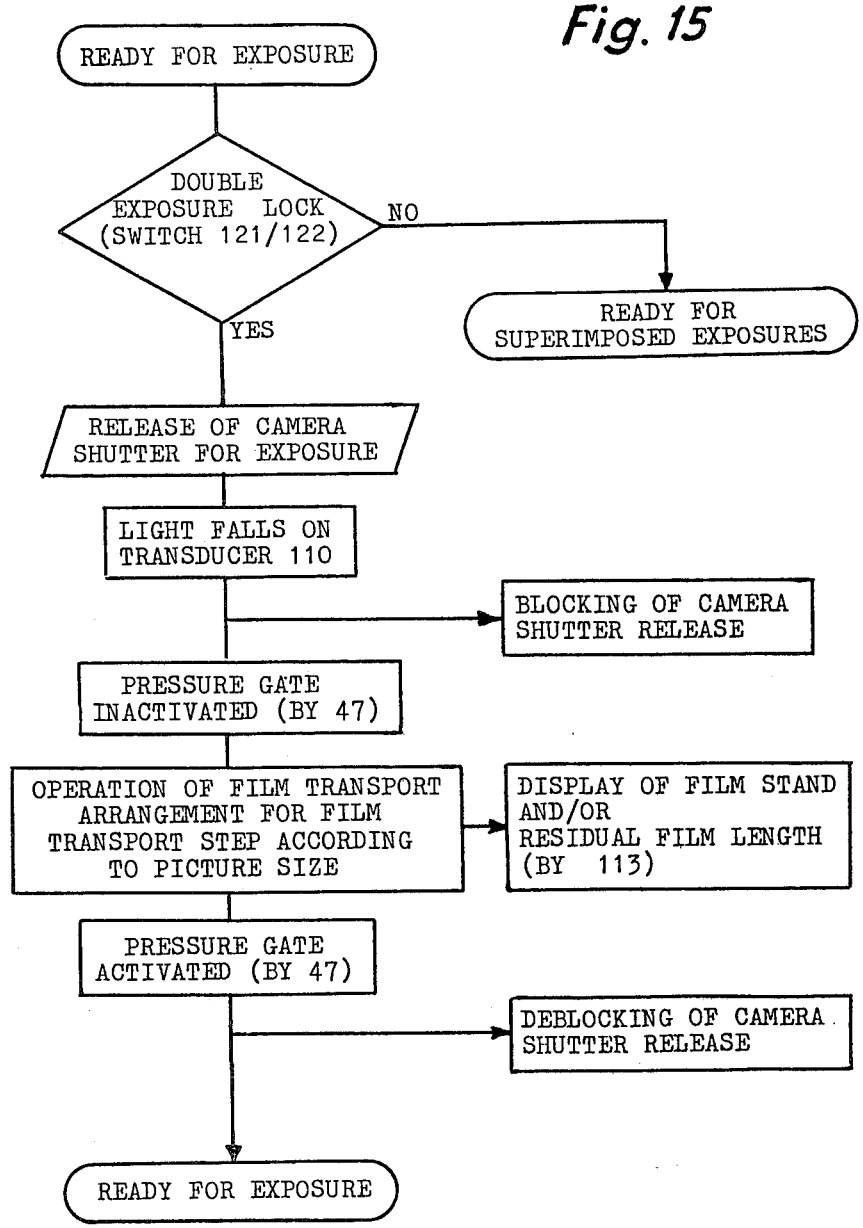
FIG. 15 shows a supplemental flow chart schematically illustrating various steps for operating the device upon actuation of the camera shutter release in order to take a single photographic exposure.

Whenever the shutter 209 of the camera is operated by way of the shutter release 208 (FIG. 8) in order to expose the part of film 25 lying behind the picture window left free by the mask parts 51 and 52, the light will strike the optical-electrical transducer 110 (FIGS. 3 and 10), as a result of which an electrical signal will develop at the inlet K of the first microprocessor unit 133, which is interpreted by the microprocessor as an exposure whenever the mask parts 51 and 52 assume the position not closing opening 22 completely. As soon as this signal disappears on inlet K, i.e., whenever the exposure is completed, the microprocessor will automatically control a film travel process, assuming that switch 122 (FIGS. 2 and 11) is in the proper position, whereby double or multiple exposures are made impossible. The film travel process at first starts with deactivating the film-contacting device 29, 30 and 35 to 47 (FIG. 5B) by a control signal appearing at the outlet R of the first microprocessor unit 133 (FIG. 10) which activates the transistor 160 into a conductive state, as a result of which the magnet coil 162 of the electromagnet 47 is energized. The latter forces the ring 37 (FIG. 5B) to rotate, as a result of which the support disk 40 is moved by means of sloping gliding surfaces 38 and 39 in the direction toward the rear wall 23 of the housing 20. At the same time, the contact plate 29 is lifted off the film 25 by means of the central bolt 41 and against the action of spring 30 so that during the successive film travel less friction need be overcome. The immediately succeeding actual film travel is accomplished according to a control signal at outlet G of the third microprocessor unit 135. This signal on the one hand starts the electromotor 75 (FIGS. 5A and 12) and puts the magnet coil 177 of the electromagnet 78 (FIGS. 5A and 12) in an energized state. As a result, the gear pinion 71 (FIG. 5A) engages with gear 67 which is coupled with the wind up spool 34 so that the latter is driven by the motor 75. The film 25 is thus wound up on this spool 34, whereby the measuring roll 28 is driven by the movement of the film. Electrical pulses are produced by means of the transducer 95 (FIGS. 5A and 10) connected with the measuring roll 28 on the signal inlet L of the first microprocessor unit 133, the number of which reflects the feed of film 25. As soon as the film feed agrees with the dimension of the picture window left open by mask parts 51 and 52, measured in longitudinal direction of the film, or is a little greater, then the microprocessor automatically turns off the control signal at the outlet C of the third unit 135, whereby the film travel motor 75 is turned off. Simultaneously a control signal appears at the outlet S of the first microprocessor unit 133 (FIG. 10), which puts the transistor 161 in its conductive state. As a result, the magnet coil 163 of the electromotor 47 is energized, which again activates the film-contacting device 29, 30 and 35 to 47 so that the contact plate 29 forces the film 25 against the guides 31 under the influence of spring 30. The apparatus is now ready for another photographic picture. The described steps of operation in connection with the exposure of a photographic picture are schematically illustrated in FIG. 15.

Figure 16:
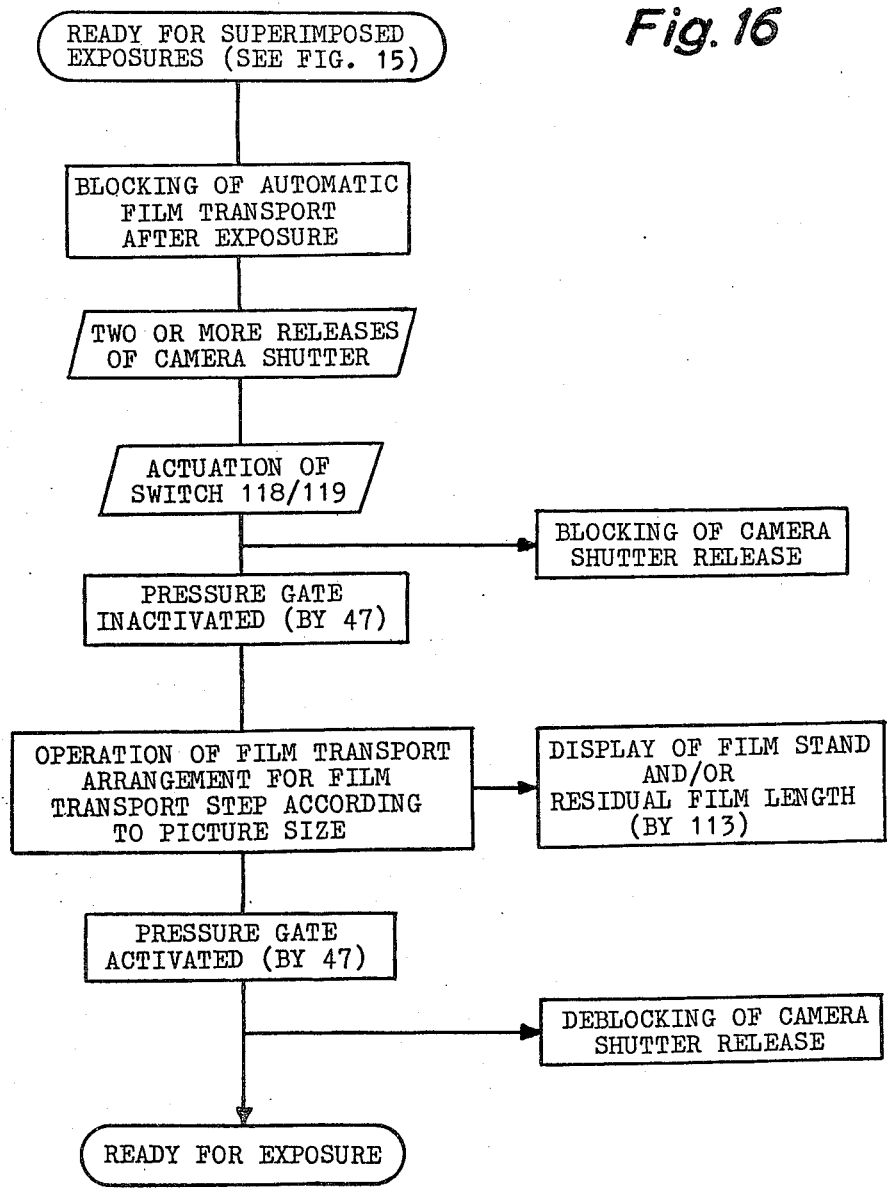
FIG. 16 shows a similar flow chart schematically illustrating the steps for operating the device when two or more superimposed photographic exposures are to be made.

In case the photographer desires to superimpose two or more exposures on one another, prior to the first exposure he will put the switch 122 (FIGS. 2 and 11) into a position wherein the above-mentioned double exposure lock is overridden. In this mode there will be no automatic film travel after exposure so that one and the same part of the film may be exposed a second time and possibly several times. In order to bring about a film travel after the last of these exposures, the photographer must operate the push button 118 (FIG. 4). As a result, the switch 119 is temporarily closed and an electrical signal is produced at the inlet Q of the first microprocessor unit 133, which releases the contact pressure device 29, 30, 35 to 47 and the film travel. The described steps of operation in connection with two or more superimposed exposures are schematically shown in FIG. 16.

Whenever the photographer wishes to take the following picture with a larger picture format, then he merely needs to adjust the rotary knob 81 (FIG. 1) until the digital recording device 113 (FIG. 4) visually records the desired larger format. By means of the transducer 89 (FIG. 11), which is coupled with the rotary knob 81, a theoretical value signal reflecting the newly selected format is produced at the inlets K, L and M of the second microprocessor unit 134. The third microprocessor unit 135 (FIG. 12) controls the two electromotors 57 and 60 by means of signals at the outlets C and E in such a way that the mask parts 51 and 52 are moved oppositely and assume a new open position, whereby the picture window left open by them has the newly selected format. The pertinent actual position of the mask parts 51 and 52 is continuously sent to the second microprocessor unit 134 (FIG. 11) by the transducers 93 and 94 coupled with the mask parts. As soon as there is agreement between the signals of the transducers 93 and 94 and the theoretical value signals of the transducer 89, the driving motors 57 and 60 of the mask parts are stopped by the third microprocessor unit 135 (FIG. 12). The new position of the mask parts 51 and 52 is recorded visually by means of the analogue recording device 114.

Figure 17:
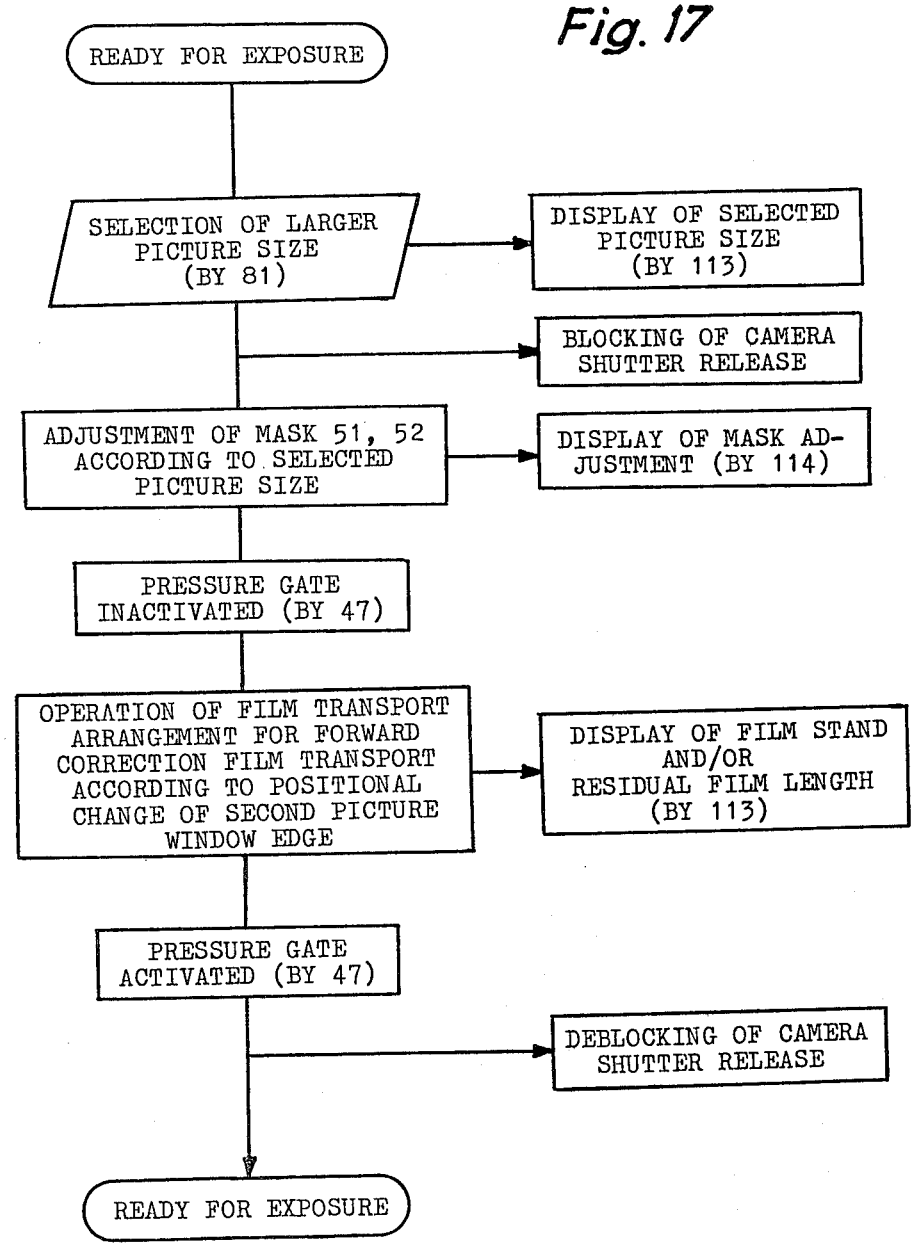
FIG. 17 shows a further flow chart schematically illustrating the steps for operating the device with a photographer's selection of a larger picture size.

Practically simultaneously with the described adjustment of the rotary knob 81 for the selection of format, a forward correcting travel of film 25 automatically takes place, i.e., the following processes take place: At the outlet R of the first microprocessor unit 133 (FIG. 10) a control signal appears, which directs the magnet coil 162 of the electromagnet 47 by means of transistor 160 into an energized state. Thus the film contact pressure apparatus 29, 30, 35 to 47 is deactivated. Immediately thereafter, a signal which puts the motor 75 of the film travel device in motion and directs the magnet coil 177 of the electromagnet 78 into an energized state by means of transistor 175 appears at the outlet G of the third microprocessor unit 135 (FIG. 12). As a result, the motor 75 is coupled with the wind up spool 34 (FIG. 5A). The latter is thus driven, such that the film 25 is moved forward. The measuring roll 28 is rotated by the film feed, and the transducer 95 coupled therewith is operated, which allows a number of electrical impulses to develop on the signal inlet L of the first microprocessor unit 133 (FIG. 10) corresponding to the film feed. The microprocessor continuously compares the number of these impulses with the changes of the signal from transducer 89 caused by adjustment of the rotary knob 81. As soon as the film feed amounts to half enlargement of the format set on the rotary knob 81, the signal at the outlet G of the microprocessor unit 135 (FIG. 12) disappears, as a result of which the driving motor 75 is stopped and any further film travel ceases. A signal now appears at the outlet S of the first microprocessor unit 133 which directs the magnet coil 163 of the electromagnet 47 into an energized state by means of the transistor 161, as a result of which the film travel apparatus is again activated. One may recognize that in practice a forward correcting travel of the film 25 takes place during the adjustment of the rotary knob 81, in the sense of an enlargement of the picture window left open by the mask parts 51 and 52, and more specifically by one correcting travel step, which corresponds with the dimension of the position shift of mask part 52 required for the change of format which defines—viewed in the forward travel direction of the film—the second transverse edge of the picture window. In this way any overlapping of successive, latent photographic pictures on the film 25 is prevented. The described steps of operation in connection with the selection of a larger picture size are schematically illustrated in FIG. 17.

Figure 18:
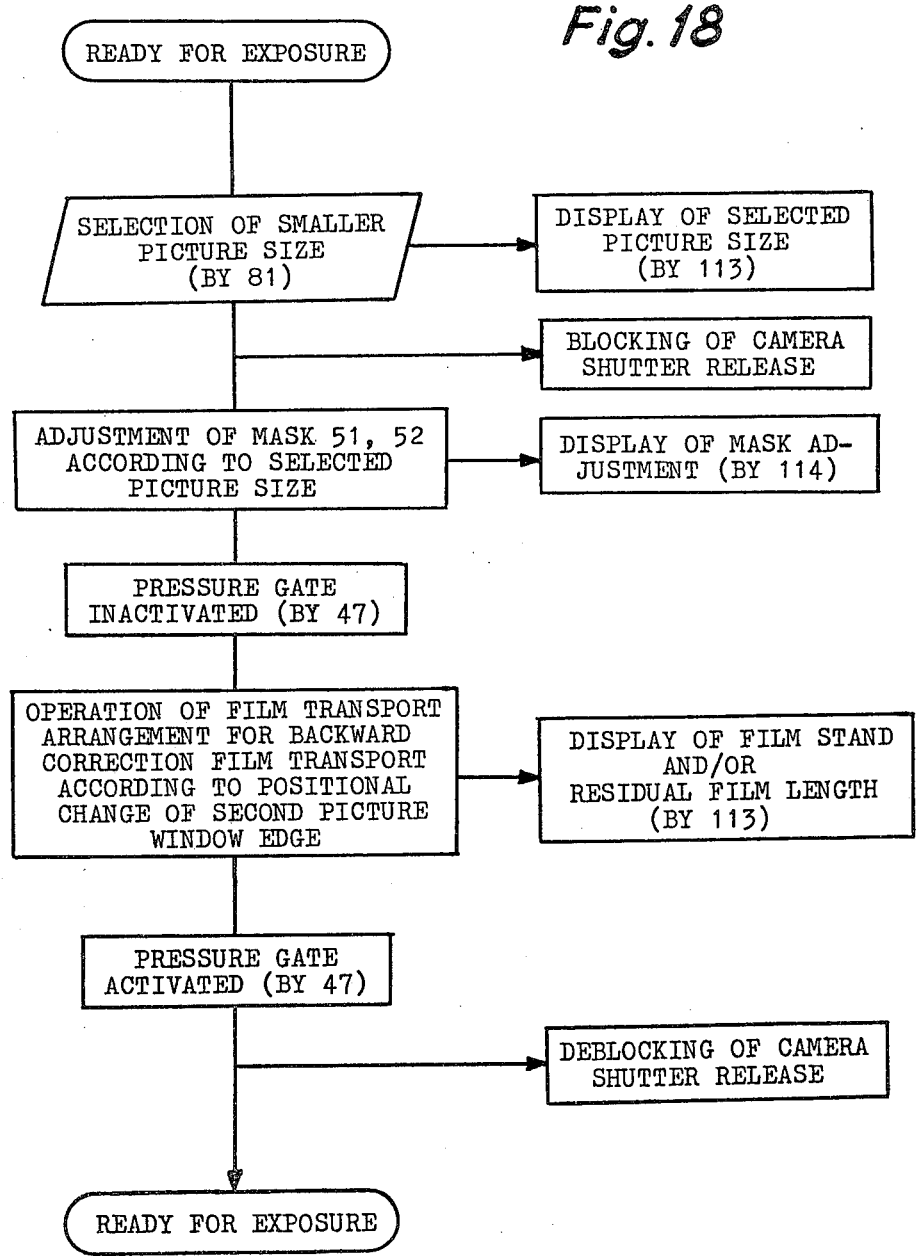
FIG. 18 shows a similar flow chart schematically illustrating the steps for operating the device with a photographer's selection of a smaller picture size.

Whenever the photographer desires to take the next picture with a smaller picture format, he merely needs to adjust the rotary button 81 until the recording device 113 (FIG. 4) digitally records the desired format. Then the driving motors 57 and 60 of the two mask parts 51 and 52 are controlled by means of signals at outlets D and F of the third microprocessor unit 135 in such a way that the mask parts move oppositely into changed positions until the picture window left open by the mask parts has the selected smaller format. A rearward correcting travel of the film 25 takes place practically simultaneously and automatically with the adjustment of the rotary knob 81. At the same time, the following processes take place: By a signal occurring at outlet R of the first microprocessor unit 135 (FIG. 10), the magnet coil 162 of the electromagnet 47 is directed by means of transistor 160 into an energized state, as a result of which the film contact pressure apparatus 29, 30, 35 to 47 is deactivated. Furthermore, the motor 75 of the film travel apparatus is started by a signal at the outlet H of the third microprocessor unit 135 (FIG. 12) and the magnet coil 178 of the electromagnet 78 is directed by means of transistor 176 into an energized state. As a result, the motor 75 is coupled with the unwinding spool 26 (FIG. 5A), after which the latter is driven such that the film 25 is wound onto the feed spool 26 and thus is moved backwardly. This backward movement of the film is measured by means of the measuring roll 28 and of the transducer 95 coupled therewith. The microprocessor 30 compares the number of pulses produced by the transducer 95 with the changes of the signal from transducer 89 caused by the adjustment of the rotary knob 81. As soon as the extent of the backward movement of the film 25 amounts to a half decrease of the format set by the rotary knob 81, the microprocessor stops the driving motor 75 of the film travel apparatus. At the same time, the film contact pressure apparatus 29, 30, 35 to 47 is reactivated again by a signal from the outlet S of the first microprocessor unit 133 (FIG. 10) directing the magnet coil 163 of the electromagnet 47 into an energized state by means of transistor 161. It is apparent that during the adjustment of the rotary knob 81, in the sense of a reduction of the picture window left open by the mask parts 51 and 52, a backward travel of the film 25 takes place, and more specifically by one step of correcting travel which agrees with the dimension of the position shift of the mask part 52 needed for the change of format. In this way any unnecessary loss of film as a result of unused areas between the successive latent pictures on the film will be avoided. The described steps of operation in connection with the selection of a smaller picture size are schematically illustrated in FIG. 18.

Figure 19:
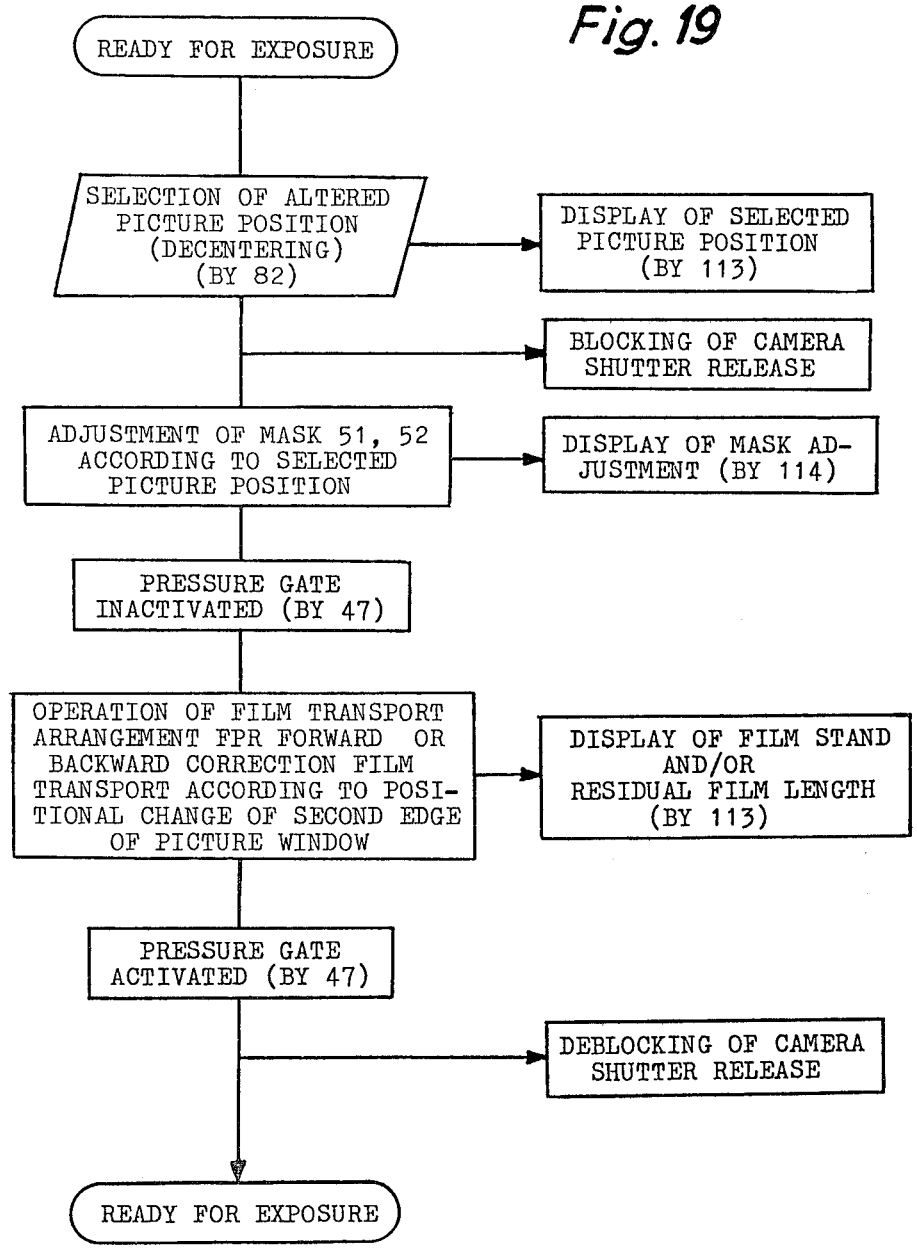
FIG. 19 shows another flow chart schematically illustrating the steps for operating the device with a photographer's selection of an altered, e.g., decentered, position of the picture to be exposed.

Whenever the photographer desires a change of position of the picture window left open by mask parts 51 and 52 instead of a change of the picture format, he then adjusts the rotary knob 82 (FIG. 1) until the digital recording device 113 (FIG. 4) shows the desired decentration of the picture window in relation to the center of the fixed light-path opening 22. At the same time, a signal is produced by means of the transducer 88 (FIGS. 6 and 11), which is coupled with the rotary knob 82, at the inlets N and S of the second microprocessor unit 134 reflecting the selected decentration. The third microprocessor unit 135 (FIG. 12) thereupon controls the two electromotors 57 and 60 by means of signals at the outlets C and F or D and E of the third microprocessor unit 135 in such a way that the mask parts 51 and 52 move in the same direction, so that the picture window left open between them, with the size remaining the same, shifts in the longitudinal direction of the fixed light-path opening 22. The specific position of the mask parts 51 and 52 or of the picture window left open by them is continuously visually indicated by the analogue recording device 114 in relation to the fixed light-path opening 22. A forward and backward corrective travel of the film 25, depending on whether the picture window is shifted in the forward or backward travel direction of the film, takes place automatically and practically simultaneously with the described shifting in the rotary knob 82. The corrective travel is controlled based on the signal of the transducer 88, which is coupled with the rotary button 82. In any case, the corrective travel step agrees with the change of position of the mask part 52 needed for the change in position of the picture window, which—viewed in the forward travel direction of the film—defines the second transverse edge of the picture window. In this way again, any overlapping of the successive latent pictures on film 25, as well as unused intervals between the succeeding pictures, will be avoided. The described steps of operation in connection with the selection of an altered picture position within the fixed light-path opening 22 are schematically illustrated in FIG. 19.

Naturally, it is possible to change the format and the decentration of the picture window in any arbitrary sequence and possibly also several times in succession. However, changes in the position of the picture window within the fixed light-path opening 22 are understandably only possible whenever the selected format of the picture window is smaller than the format of the light-path opening 22. Moreover, decentrations of the picture window make sense only insofar as the one or the other transverse edge of the picture window coincides with a transverse edge of the light-path opening 22. The analogue recording device 114 is an advantageous expedient in order to indicate the extent and the limits of the decentration to the photographer. The microprocessor 130 is effectively constructed such that it starts a special warning apparatus, e.g., a signalling lamp or of an accoustic signalling device, and/or blocks the camera shutter, whenever the photographer selects a decentration of the picture window which may not be realized based on the selected picture window format.

During all movement of the mask parts, as well as during every film travel, no photographic pictures may be understandably made and the shutter of the camera 200 must remain closed. The camera shutter is locked in its closed state by means of an electrical signal which always appears at the outlet I of the third microprocessor unit 135 and is fed in via the plug connection 107, 210 and the line 209 (FIG. 8) to the camera shutter 203. This step of operation is illustrated in each of FIGS. 15-19. In case of a preferred embodiment of the apparatus of the invention, provision is additionally been made that the locked state of the shutter is always recorded visually, e.g., by periodic blinking of the digital recording on the recording device 113, or by separate warning light (not shown).

It has already been said that the digital recording device 113 indicates the residual length of the film 25 still available for additional photographic pictures whereby the transducer 97 (FIG. 5A), which coupled with the measuring roll 28, is provided for the production of the pertinent electrical signals. In practice it may happen that the photographer may wish to take a picture toward the end of the film 25 for which the still unexposed residual length of the film does not suffice. For this situation there is provided a warning signal transmitter of an optical or accoustic type which is controlled by the microprocessor 130 and always activates whenever too large a picture is selected. In this case an additional photographic picture with a smaller format is still possible in most cases. The photographer must then set a smaller format by means of the format selecting knob 81, until the warning signal transmitter is no longer activated.

Whenever the photographer wishes to remove the housing 20 from the camera 200, e.g., whenever he is finished with his picture taking or whenever he wants to observe the ground glass screen between two successive pictures, then the photographer must operate the press button 124 (FIG. 2), as a result of which the switch 126 is temporarily closed and a signal is applied to the inlet H of the first microprocessor unit 133 which induces the microprocessor to deliver control signals at the outlets D and F of the third microprocessor unit 135 (FIG. 12) that activate the driving motors 57 and 60 and in such a way that the mask parts 51 and 52 move into a position completely closing the fixed light-path opening 22, whereupon the motors 57 and 60 are stopped. Subsequently a control signal appears at the outlet G of the first microprocessor unit 133 (FIG. 10) which puts the magnet coil 156 of the electromotor 103 into an energized state by means of the transistor 158 so that the locking pegs 101 and 102 may be withdrawn by means of the magnet 103 and the housing 20 on the guide frame 205 for the cassette is unbolted. Removing of the housing 20 makes the switch 106, by means of peg 105, go into open position with the result that the control signal at output F of the first microprocessor unit 133 acquires a value at which the transistor is no longer conductive. As a result, the current supply circuit of the relay 147 is interrupted so that the relay contact 148 opens and the further power supply to the microprocessor 130 and the other consumers of power in the apparatus is interrupted. The housing 20 may then be removed from the camera in such a way that the film 25 is protected against undesirable incidence of light by means of the mask parts 51 and 52.

The described switching off sequence is automatically carried out by the microprocessor 130 even if during a predetermined time no changes in the signals have occurred at the inlets of the microprocessor units 133 to 135, i.e., if the photographer leaves the apparatus of the invention unused on the camera.

Here we still should like to state that the microprocessor 130 is constructed in a known manner such that it is capable of storing the data originating from the transducers even if the current feed is turned off. However, an embodiment is also possible wherein the transducers always feed the electrical signals corresponding to their pertinent position again into the microprocessor as soon as the electrical supply is turned on again. Furthermore electrical contacts may be associated with the rotary knobs 81 and 82 and to the transducers coupled with them, which are connected in parallel to the switch 125 (FIG. 10) and are constructed such that in the beginning of any operation of the rotary button 81 or 82, one of the contacts mentioned is temporarily closed, and as a result of the electrical supply, is automatically turned on. Besides, the expert active in this special field is familiar with the method of operation of the microprocessor. Let us just mention here that the feed-data of the various transducers are evaluated by the microprocessor control depending on the measure-signal of the measure generator 153 (FIG. 10), as a result of which it will be possible to arbitrarily change the sequence of the position changes of the transducers.

It is clear that, instead of the microprocessor shown in FIGS. 9 to 12, a differently constructed electronic logical circuit module may be used, e.g., a microprocessor consisting of a single unit or chip with a lower member of signal inlets and/or signal outlets, whereby the various transducers or the various consumers of power to be periodically controlled are connected alternatingly to the inlets or outlets. Likewise, the described microprocessor may be replaced entirely or partly by a conventional electronic mechanism with commercial semiconductors and/or integrated circuits.

In case of another variation, not shown, of the described embodiment of the invention, two separate electromotors for the drive of the wind up spool 34 or of the unwinding spool 26 may be present, whereby these motors are continuously coupled by way of reduction gears with the axle journals 65 and 68 carrying the spools 34 and 26. Depending on whether a forward travel or a backward travel of film 25 is required, one or the other electromotor is started by means of the microprocessor.

Still another variation of the embodiment of the invention, likewise now shown may include a single electromotor for both the forward as well as for the backward travel of film 25, whereby the arrangement is such that in case of a certain rotational direction of the motor, only the wind up spool 34, and in case of the opposite rotational direction of the motor, only the unwinding spool 26, is driven.

Figure 13:
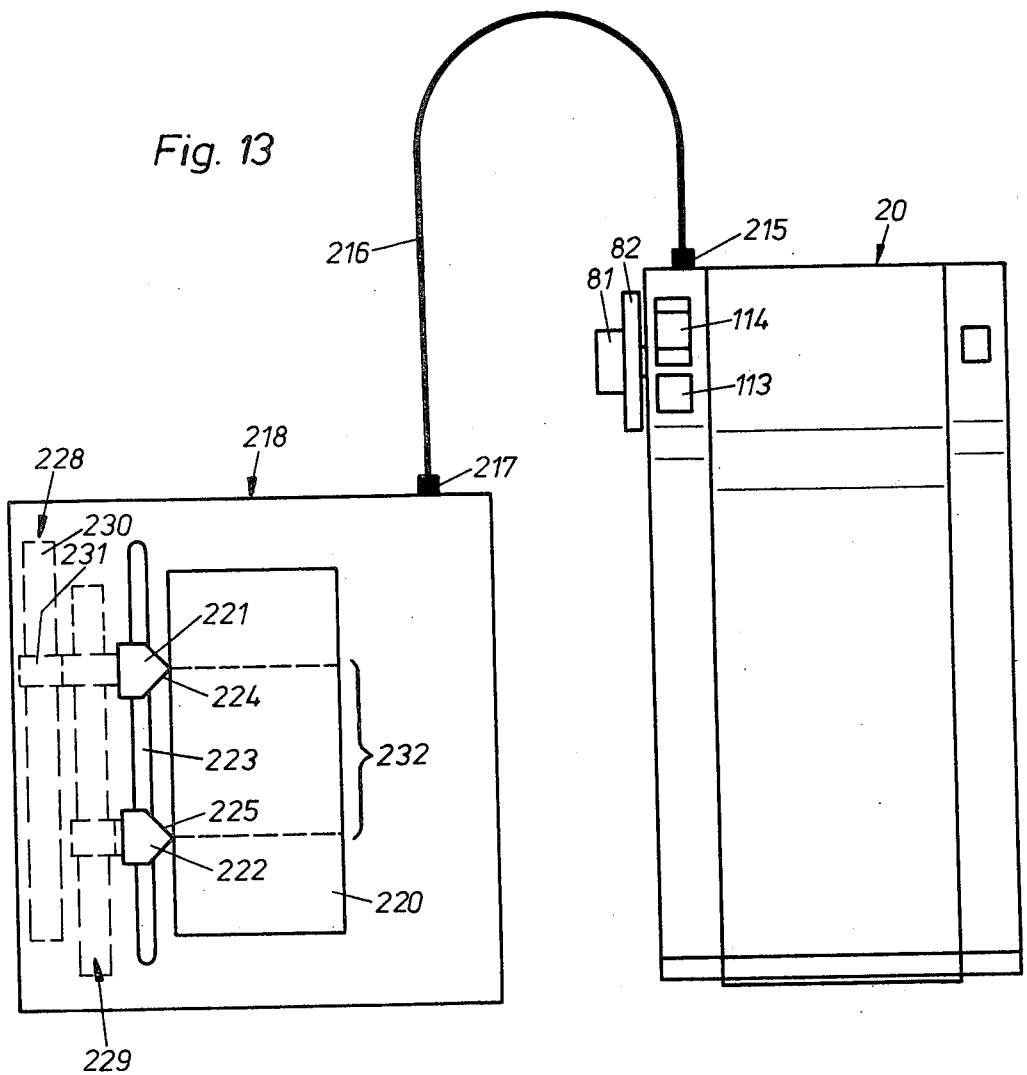
FIG. 13 shows a view of a second embodiment of the apparatus of the invention.

FIG. 13 shows a second embodiment of the apparatus of the invention, whereby for easier understanding, the same reference numbers have been used as for the first embodiment, as far as corresponding elements are concerned.

In the right-hand part of FIG. 13 the housing 20 has been shown as viewed from its backside. The mechanical and electrical parts which are disposed on and in housing 20 are identical to those of the first embodiment. Additionally, however, there is a contact 215 on the upper part of housing 20 for a multicore (multiconductor) electrical cable 216, which is connected by means of a contact 217 with a ground glass or finder device 18. The latter has the same external shape as the conventional ground glass frame 206 of a photographic ground glass camera as illustrated schematically, e.g., in FIG. 8, and assumes the place of the conventional ground glass frame. The device 218 is equipped with a ground glass 220 which has the same size and format as the fixed light-path opening 22 of the housing 20. The individually and manually-adjustable sliding handles 221 and 222 are shiftably guided along a longitudinal edge of the ground glass 220. These sliding handles slide in a guide groove 223 and have a mark 224 or 225 constructed like an arrow which is intended to record the position of one or the other transverse edge of the desired picture window for the next photographic picture on the ground glass 220. Each of the sliding handles 221 and 222 is coupled with an associated transducer 228 or 229 for the production of an electrical signal which reflects the pertinent position of the pertinent sliding handle. The transducer 228 consists of several code paths 230 fixedly disposed in the device 218 with electrically conductive and non-conductive sections, as well as a sliding contact group 231 which is associated with the code paths and is mechanically coupled with the sliding handle 221. The other transducer 229 is similarly constructed. Each of the transducers 228 and 229 is connected via the electrical line 216 with proper single inlets (not shown) of the microprocessor in the housing 20. The contact 215 on housing 20 is releasably constructed and effective in such a way that a switching off of the transducers coupled with the rotary knobs 81 and 82 takes place automatically whenever and as long as the line 216 is connected with housing 20.

The method of use and operation of the device of the invention with reference to the embodiment described with reference to FIG. 13 as follows:

Whenever the contact 215 of line 216 is separated from and taken of housing 20, the part of the device shown in the right half of FIG. 13 may be used exactly the same way as has been described with reference to FIGS. 1 to 12. On the other hand, whenever the line 216 is connected to housing 20, the transducers coupled with the rotary knobs 81 and 82 for selecting of the format or the decentration of the picture window are disconnected. Instead, the transducers 228 and 229 of the ground glass and finder arrangement 218 are connected in housing 20 with the microprocessor. By individual adjustment of the sliding handles 221 and 222 the photographer is now able to freely select the position of each transverse edge of the picture window within the fixed light-path opening 22. Whenever neither the housing 20 or any other cassette for light-sensitive material is attached to the camera and the camera shutter is opened, then the photographer will be able to observe the subject to be taken on the ground glass 220 and may adjust the sharpness of the picture and the sections of the subject, whereby both the format as well as the position of the section of the subject may be arbitrarily selected within the contours of the ground glass 220 with the help of the two sliding handles 221 and 222. Electrical signals are fed into the microprocessor in the housing 20 by means of transducers 228 and 229, which are coupled with the sliding handles 221 and 222, which always reflect the selected positions of the sliding handles. As soon as the camera is adjusted as wanted, the photographer pushes the housing 20 between the guide frame of the cassette and the ground glass and finder arrangement 218, and then closes the camera shutter. Afterwards, the mask parts 51 and 52 in the housing 20 move automatically, in controlled dependence on the microprocessor, into such open positions that the transverse edges of the mask parts facing each other come to lie practically exactly on those places of the marks 224 and 225 of the sliding handles 221 and 222. The picture window left open by the mask parts then will agree precisely with the area 232 of the ground glass 220 lying between the marks 224 and 225 with regard to format and position. As soon as the mask parts 51 and 52 have arrived at a standstill in the described open positions, the photographer may operate the release for the camera shutter in order to take the desired picture.

Whenever adjusting the sliding handle 222, which serves for the selection of the position of the second transverse edge of the picture window, viewed in the forward travel direction of the film, then a corrective film travel in the same sense and to the same extent as the adjustment of the shifting handle 222 takes place automatically and practically simultaneously. Thus, overlapping of successive latent pictures on the film as well as unused areas between the successive pictures will be prevented. In this respect the method of operation is the same as in the case of the first embodiment.

The electro-optical recording devices 113 and 114 on the rear of the housing 20 operate in the same way as in the case of the first example, independently of whether the line 216 is connected or not with housing 20 by means of contact 215.

A variation of the embodiment of the invention shown in FIG. 13, not shown in more detail, differs therefrom only by the fact that the apparatus 218 is constructed without a ground glass as a subject finder. This subject finder may produce, e.g., an aerial photograph which the photographer may observe by means of a large-field eye piece.

While with the embodiments described the shifting of the mask parts and the film transport will always be accomplished due to electro-mechanical elements, simpler embodiments of the inventive device are also possible wherein the movements mentioned may be at least partly accomplished by hand. In such a case, stops are moved by the electronic means which limit the movements mechanically brought about so that the film is moved one step forward after each picture is taken. This step will correspond with the dimension of the picture window used for the picture, measured in the longitudinal direction of the film, i.e., after shifting the mask parts, corrective travel of the film will be achieved to the extent that the mask part defining the second transverse edge of the picture window has been shifted.

The apparatus of the invention may also be integrated into a photographic camera so that the camera and the inventive apparatus form a unitary constructional unit.

We claim:

1. A device for use in making photographic exposures on a strip-shaped, light-sensitive material, said device comprising a housing having a picture area-limiting frame providing a fixed light-path opening, means for guiding the strip-shaped light-sensitive material within the housing and behind the light-path opening, a transport arrangement for the forward transport of the strip-shaped material in steps in its longitudinal direction, at least one adjustable mask for covering portions of the light-path opening to thereby form a picture window which is smaller than the light-path opening, the portions of the light-path opening which can be covered by the mask adjoining opposite edges of the light-path opening that are at right angles to the longitudinal direction of the strip-shaped material so that a first edge of the picture window as well as a second edge of the picture window as seen with respect to the forward transport direction of the strip-shaped material are alterable in position by displacement of the mask, adjustable means for selecting a desired picture window as to its size and/or position within the picture area, first mechanical-electrical transducer means coupled with said means for selecting the picture window for producing electrical signals in response to the selected picture window, second mechanical-electrical transducer means associated with said transport arrangement for producing electrical signals in response to any displacement of the strip-shaped material in its longitudinal direction, at least one electronic logical circuit arrangement having a plurality of signal inputs and outputs, said first and second transducer means being electrically connected with some of the signal inputs of said electronic logical circuit arrangement, and electrically-operated transport control means associated with the transport arrangement for the strip-shaped material, said transport control means being connected with some of the signal outputs of the logical circuit arrangement, said logical control arrangement being connected to deliver to said transport control means output signals dependent on the signals from said first and second transducer means for controlling the transport arrangement such that the steps of forward transport caused by the transport arrangement for the strip-shaped material area automatically limited in accordance with the size of the picture window defined by the mask and such that each adjustment of the means for selecting the picture window, which calls for a positional change of the second edge of the picture window in the forward transport direction of the strip-shaped material, automatically produces a forward correction transport of the strip-shaped material at least equal to said positional change.

2. A device according to claim 1, wherein said adjustable mask is operatively coupled with a reversible driving device for adjusting the mask and with third mechanical-electrical transducer means for producing electrical signals in response to the actual position of the mask, said third transducer means being connected with another of the signal inputs of the electronic logical circuit arrangement, and electrically-operated mask control means associated with the driving device for adjusting the mask and connected with another of the signal outputs of the logical circuit arrangement, said logical circuit arrangement being connected to deliver to said mask control means output signals dependent on the signals from said first and said third transducer means such that the mask automatically is adjusted in accordance with the actual adjustment of the means for selecting the picture window.

3. A device according to claim 2, wherein an electrical switch means capable of being brought into either a first or a second switching condition is connected with at least a further one of the signal inputs of the electronic logical circuit arrangement, said logical circuit arrangement being connected to deliver to the mask control means said output signals for controlling the automatic adjustment of the mask in accordance with the actual adjustment of the means for selecting the picture window, provided that said switch means is in its first switching condition, whereas when said switch means is in its second switching condition, the output signals delivered to the mask control means automatically control the adjustment of the mask to a position completely closing the light-path opening, irrespective of the actual adjustment of the means for selecting the picture window.

4. A device according to claim 3, wherein said switch means comprises an optical-electrical transducer which is in said second switching condition whenever and as long as light falls thereon.

5. A device according to claim 2, wherein the mask is formed by two separate parts which are independently shiftable in the longitudinal direction of the strip-shaped material, one of said parts defining the first transverse edge of the picture window left open by the mask and the other of said parts defining the second transverse edge, said driving device for adjusting the mask comprising two reversible motors, each of which is coupled with one of the two parts of the mask and is controlled by said mask control means, said third transducer means comprising two mechanical-electrical transducer units, each of which is coupled with one of the two parts of the mask and is electrically connected with some of the signal inputs of the electronic logical circuit arrangement for producing electrical signals in response to the actual positions of the two parts of the mask.

6. A device according to claim 5, wherein the transport arrangement for the strip-shaped material is capable of a reverse transport of the strip-shaped material, and the electronic logical circuit arrangement is arranged so as to deliver to said control means output signals dependent on the signals from said first and second transducers, adjustment of the means for selecting the picture window, which calls for a positional change of the second edge of the picture window counter to the forward transport direction of the strip-shaped material, automatically producing a reverse correction transport of the strip-shaped material at most equal to said positional change.

7. A device according to claim 5, wherein an optical-electrical transducer is connected with one of the signal inputs of the electronic logical circuit arrangement, said logical circuit arrangement being connected to automatically always call for a forward transport step of the strip-shaped material after light has fallen on the optical-electrical transducer and while the mask is in an open position.

8. A device according to claim 7, wherein one of the signal inputs of the electronic logical circuit arrangement is connected with an arbitrarily actuatable electrical switch, and the logical circuit arrangement is connected so that with a predetermined switching condition of the switch, the automatic calling for a forward transport step is blocked.

9. A device according to claim 5, wherein said adjustable means for selecting the picture window comprises two separately actuatable adjusting means, one for selecting the size of the picture window and the other for selecting the position of the picture window with respect to the center of the light-path opening, and wherein said first transducer means comprises a pair of mechanical-electrical transducer units, each of which is coupled with one of the adjusting means for producing electrical signals in response to the selected size and position, respectively, of the picture window, said transducer units being each connected with some of the signal inputs of the electronic logical circuit arrangement.

10. A device according to claim 5, wherein said adjustable means for selecting the picture window comprises two separately actuatable adjusting means for selecting the positions of the first and second transverse edge, respectively, of the picture window, and wherein said first transducer means comprises a pair of mechanical-electrical transducer units, each of which is coupled with one of said two adjusting means for producing electrical signals in response to the selected positions of the first and second transverse edges, respectively, said transducers being each connected with signal inputs of the electronic logical circuit arrangement.

11. A device according to claim 5, wherein an electro-optical display device for displaying the size and the position, respectively, of the picture window, as selected by the means for selecting the picture window, is connected with some of the signal outputs of the electronic logical circuit arrangement, said logical circuit arrangement being connected to deliver output signals for controlling the display device in response to the signals from said first transducer means coupled with the means for selecting the picture window.

12. A device according to claim 11, wherein the display device is constructed to separately display the size and the position of the selected picture window.

13. A device according to claim 11, wherein a second electro-optical display device for displaying the actual adjustment of the mask is connected with some of the signal outputs of the electronic logical circuit arrangement, said logical circuit arrangement being connected to deliver output signals for controlling the second display device in response to the signals from said third transducer means coupled with the mask.

14. A device according to claim 13, wherein the second display device comprises an image of the fixed light-path opening and a number of strip-shaped liquid crystals or light-emitting diodes disposed within said image for the analogous display of the actual positions of the first and second transverse edges of the picture window in relation to the fixed light-path opening.

15. A device according to claim 5, wherein a further mechanical-electrical transducer means is operatively coupled with the transport arrangement for the strip-shaped material for producing electrical signals in response to the actual standing of the strip-shaped material, said further transducer means being connected with some of the signal inputs of the electronic logical circuit arrangement, and wherein an electro-optical display device for displaying data concerning the strip-shaped material is connected with some of the signal outputs of the logical circuit arrangement, said logical circuit arrangement being connected to deliver output signals for controlling the display device in response to the signals from said further transducer means.

16. A device according to claim 15, wherein the display device comprises a warning device, and wherein the electronic logical circuit arrangement is arranged to control the warning device based on the signals from the first transducer means coupled with the means for selecting the picture window and the signals from the third transducer means such that the warning device is activated whenever the residual length of the strip-shaped material is no longer sufficient for a photographic picture with the selected picture window.

17. A device according to claim 5, wherein the electronic logical circuit arrangement is further connected to deliver an output signal for blocking the release of a camera shutter or for actuating a warning device while and as long as the mask is being adjusted and the transport arrangement for the strip-shaped material is in operation.

18. A device according to claim 5, wherein a pressure device for keeping a length of the strip-shaped material lying in the area of the fixed light-path opening has at least one electromagnet associated therewith for putting the pressure device into and of the action, the electromagnet being connected with at least one of the signal outputs of the electronic logical circuit arrangement, said logical circuit arrangement being further connected to control the electromagnet so as to put the pressure device out of action just prior to each operation of the transport arrangement for the strip-shaped material and to control the electromagnet so as to put the pressure device into action just after each operation of the transport arrangement.

19. A device according to claim 5, wherein at least a part thereof is constructed as a roll film magazine (cassette) for attachment to various photographic cameras, said magazine comprising a locking mechanism for locking the magazine (cassette) in its position attached to a camera, the locking mechanism having associated therewith at least one electromagnet for activating and deactivating the locking mechanism, said electromagnet being connected with at least one of the signal outputs on the electronic logical circuit arrangement, said logical circuit arrangement being connected to control the electromagnet in the sense of deactivating the locking mechanism, provided that the mask is in a position which completely closes the fixed light-path opening.

20. A device according to claim 19, wherein the magazine (cassette) has an electrical contact which automatically is operated by attachment of the magazine to a photographic camera and by removing the magazine from the camera, said electrical contact being connected with one of the signal inputs of the electronic logical circuit arrangement, and electrical switching arrangement for activating and deactivating the logical circuit arrangement being connected with at least one of the signal inputs and at least one of the signal outputs of the logical circuit arrangement, said logical circuit arrangement being further connected to deliver to said electrical switching arrangement an output signal which causes the switching arrangement to deactivate the logical circuit arrangement when the electrical contact is operated by removing the magazine from the camera.

21. A device according to claim 20, wherein the electrical switching arrangement is constructed so as to interrupt current supply to all power consumers in the device when the electrical contact is operated by removing the magazine from the camera.

22. A device according to claim 5, wherein a part thereof is formed as a view finder device comprising a view finder field analogous to the fixed light-path opening, the adjustable means for selecting the size and the position of the picture window as well as the first transducer means coupled with the means for selecting the picture window, and a pair of adjustable marks are arranged for movement along the view finder field and operatively coupled with the means for selecting the picture window such that said marks make an analogous display of the selected positions of the first and second transverse edges of the selected picture window.

23. A device according to claim 22, wherein the adjustable means for selecting the picture window comprises a pair of separately actuatable adjusting means for selecting the positions of the first and second transverse edges, respectively, of the picture window, each of the adjusting means being coupled with one of the adjustable marks, and wherein said first transducer means comprises a pair of mechanical-electrical transducer units, each of which is coupled with one of said adjusting means for producing electrical signals in response to the selected positions of the first and second transverse edges, respectively, said transducer units being each connected with some of the signal inputs of the electronic logical circuit arrangement.

24. A device according to claim 22, wherein the view finder device is adapted for attachment to a photographic camera so that the view finder field lies in the focussing plane of the camera, and wherein another part of the device is formed as a roll film magazine (cassette) for attachment to a camera, said another part comprising the housing having the picture area-limiting frame which provides the fixed light-path opening, the means for guiding the strip-shaped material, the transport arrangement for the strip-shaped material, the adjustable mask, the reversible driving device for adjusting the mask, the second and third transducer means, the mask control means, and the electronic logical circuit means, and wherein a multiconductor electrical line is interconnected between said part forming the view finder device and said another part forming the roll film magazine for connecting the first transducer means with the pertinent signal inputs of the logical circuit arrangement.

* * * * *

UNITED STATES PATENT AND TRADEMARK OFFICE
CERTIFICATE OF CORRECTION

PATENT NO. : 4,436,399

DATED : March 13, 1984

INVENTOR(S) : Carl Koch and Karl Gfeller

It is certified that error appears in the above-identified patent and that said Letters Patent are hereby corrected as shown below:

On the title page, replace heading sections [63] and [30] with:

[63] Continuation-in-part of Ser. No. 402,421, Jul. 28, 1982, abandoned, which is a continuation of Ser. No. 161,647, Jun. 20, 1980, abandoned.

[30] Jun. 21, 1979 [CH] Switzerland..............5794/79

Signed and Sealed this

Thirtieth Day of October 1984

[SEAL]

Attest:

Attesting Officer

GERALD J. MOSSINGHOFF

Commissioner of Patents and Trademarks